(12) United States Patent
Grussing et al.

(10) Patent No.: US 7,734,488 B2
(45) Date of Patent: Jun. 8, 2010

(54) FUNCTIONALITY INDEX (FI) FOR USE WITH AN ENGINEERING MANAGEMENT SYSTEM (EMS)

(75) Inventors: Michael N. Grussing, Champaign, IL (US); Donald R. Uzarski, Champaign, IL (US); Lance R. Marrano, Champaign, IL (US); Jason M. Schneider, Champaign, IL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1316 days.

(21) Appl. No.: 11/194,655

(22) Filed: Aug. 2, 2005

(65) Prior Publication Data

US 2007/0033077 A1    Feb. 8, 2007

(51) Int. Cl.
  *G06F 17/30*  (2006.01)
(52) U.S. Cl. ................... 705/7; 705/10; 705/11
(58) Field of Classification Search .......... 705/7, 705/10, 11
  See application file for complete search history.

(56) References Cited

U.S. PATENT DOCUMENTS

| | | | |
|---|---|---|---|
| 4,998,208 A | 3/1991 | Buhrow et al. | |
| 6,021,359 A | 2/2000 | Sakikabara et al. | |
| 6,047,241 A | 4/2000 | Sparago | |
| 6,581,045 B1 * | 6/2003 | Watson | 705/400 |
| 6,597,973 B1 | 7/2003 | Barich et al. | |
| 6,772,098 B1 | 8/2004 | Stark et al. | |
| 7,058,544 B2 * | 6/2006 | Uzarski et al. | 702/184 |
| 2002/0147681 A1 * | 10/2002 | Taninaka et al. | 705/40 |
| 2003/0036942 A1 * | 2/2003 | Wescott | 705/9 |
| 2003/0097288 A1 | 5/2003 | Shimomura et al. | |
| 2005/0256835 A1 * | 11/2005 | Jenkins et al. | 707/1 |

OTHER PUBLICATIONS

The State of Queensland, Department of Public Works. Strategic Asset Management: Functionality Assessment Guidelines. 1996.*

U.S. Department of Navy. Strategic Sourcing: A Broader Approach. Guide to Functionality Assessments, Jun. 2000.*

American Society for Testing and Materials (ASTM). ASTM Standards on Whole Building Functionality and Serviceability, ASTM Subcommittee E06.25 on Whole Buildings and Facilities, 2nd ed. ISBN 0-B031-2734-0. 2000, West Conshohocken, PA.*

(Continued)

*Primary Examiner*—Beth V. Boswell
*Assistant Examiner*—Stephanie Zagarella
(74) *Attorney, Agent, or Firm*—Earl H. Baugher, Jr.

(57) ABSTRACT

A top-down tiered process establishes an objective measure of the functional capacity of an asset to address a specified use. The process comprises: developing Issue Categories and lists of functional impact Sub-issue Types and specific issues under each type that may impact functionality of the asset for a specified use; providing the list to evaluators; employing evaluators to evaluate functionality, evaluators assigning a numerical Severity measure to each Sub-issue Type present during the evaluation; recording occurrences of issues under each Sub-issue Type discovered, summing occurrences to determine a Density of each Sub-issue Type; recording the evaluation in one or more engineering management systems (EMS); and using the recorded evaluation, calculating a value to be inserted on a numerical scale as a functionality index, FI. In select embodiments of the present invention, a numerical scale is used with values from 0-100.

51 Claims, 10 Drawing Sheets

OTHER PUBLICATIONS

U.S. Appl. No. 10/866,609, Uzarski et al.

Grussing, M.N., et al., Building Infrastructure Functional Capacity Measurement Framework, ASCE Journla of Infrastructure Systems, Dec. 2009, pp. 371-377.

Marrano, L.R., et al., Building Level Functionality Assessment, ERDC-CERL Technical Note, TN-06-02, Jan. 2006.

Uzarski, D.R., Development of Condition Indexes for Low Volume Railroad Track, USACERL Technical Report FM-93/13, Jul. 1993.

American Society for Testing and Materials, ASTM Standards on whole Building Functionality and Serviceability, 2000, West Conshohocken, PA.

* cited by examiner

ADA Compliance Requirements

- ☑ ADA compliant route of travel to the building
- ☑ ADA compliant ramps
- ☑ ADA compliant parking and/or drop-off area
- ☑ ADA compliant entrance
- ☑ ADA compliant horizontal circulation
- ☑ ADA compliant doors (into necessary spaces)
- ☑ ADA compliant (necessary) rooms and spaces
- ☑ ADA compliant egress systems
- ☑ ADA compliant general and room signage
- ☑ ADA compliant directional and informational signage
- ☑ ADA compliant controls
- ☑ ADA compliant seats, tables and chairs
- ☑ ADA compliant vertical circulation
- ☑ ADA compliant stairs (connecting levels not serviced by elevator, ramp, or lift)
- ☑ ADA compliant elevators
- ☑ ADA compliant lifts
- ☑ ADA compliant restrooms
- ☑ ADA compliant restroom stalls

FUNCTIONALITY INDEX (FI) FOR USE WITH AN ENGINEERING MANAGEMENT SYSTEM (EMS)

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Bea Shahin at 217 373-7234 or Phillip Stewart at 601 634-4113.

BACKGROUND

In the United States, the Department of Defense is responsible for nearly 380,000 facilities estimated at a plant replacement value of $435 billion. These facilities play an important role in support of the military's mission. The sustainment, restoration, modernization (SRM) and eventual demolition and reconstruction of this infrastructure portfolio are of great interest to facility planners and policy makers.

Building investments are made and buildings are constructed to support some specified mission or purpose. The building design process yields the optimal building location, materials, and configuration to best serve that purpose. As the building operates in service and ages, building materials, components, and systems deteriorate, leading to some less than optimal ability to support its mission. This loss is determined through a condition assessment process and may be measured by a condition index, CI, such as described in U.S. Pat. No. 7,058,544 B2, Knowledge-Based Condition Survey Inspection (KBCSI) Framework and Procedure, to Uzarski et al., 6 Jun. 2006, incorporated herein by reference. Building performance, i.e., ability to support a specified mission, is also impacted by general obsolescence, e.g., inability to support a new mission.

This obsolescence may be due to change in user requirements, technological obsolescence and changes in building codes and regulations. For example, as user requirements change or the mission changes, as is likely to happen during the lifespan of a permanent building, the "functional capability" of the building to support a current mission has decreased some amount. This loss may be determined objectively and quantitatively through a functionality assessment and measured by a functionality index (FI). Building condition is improved through repair, restoration, or both. However, a gain in functionality generally requires facility modernization.

"Building Performance" is measured at a specific point in time and defined as the "in service" suitability of a building for a specified mission. Among other indicators, it refers to how well, how safe, and how efficient a building supports a given mission. A building's "performance state" may be defined to be dependent on two attributes of the building, the "physical condition state" and the "functionality state."

The physical condition state provides a measure of the "general health" of the building. Physical deterioration of the building due to normal aging, excessive or abusive use, or poor maintenance reduces ability to support its initially established mission. For example, a leaking roof reduces the building's ability to provide a comfortable, safe environment. Research has focused on quantifying the condition state of a building in a consistent, objective, and repeatable fashion. In the BUILDER® Engineering Management System (EMS) the physical condition state is quantified using a Condition Index (CI).

The functionality state relates to the facility's ability to support a specific mission, whether it be the designed mission, a present mission or a proposed mission. It is an estimate of the capability of a facility or building to support performance of a current mission in the absence of physical deterioration. An impact to functionality, e.g., loss or degradation due to an inefficient building layout, improper choice of materials or equipment, building code violations, and the like, affects mission performance even though the condition of the building is new. Changes to functionality may arise independently after the building has been put in service, e.g., changes in user requirements, building codes, materials, technology, and the like. For example, an existing maintenance facility without the proper size and configuration to handle current military equipment has reduced capability to support a mission of vehicle maintenance. Impact to functionality may be qualitatively described by identifying those constraints inherent in the building design that lead to less than optimal mission support when compared to a new "purpose-built" building designed to support that specified mission at the highest level.

Conventionally, facility or building assessments or evaluations are performed to determine the scope and estimate of required SRM work. These conventionally undertaken assessments involve the identification and recording of deficiencies or issues that lead to a less than optimal facility. Issues or deficiencies may be defined with respect to both condition and functionality. During an assessment process based on identifying issues or deficiencies, an assessor or evaluator identifies what building deficiencies or issues are to be recorded and may categorize, i.e., prioritize, identified issues. Further, an estimator may determine the cost of corrective action for each prioritized issue or deficiency, if any. At no point during this conventional procedure is any metric produced which quantitatively and objectively describes the functional capability of the building to support a given mission.

Some metrics developed from the manipulation of "backlog data," are based on the cost of corrective action. The use of backlog data does not provide an acceptable basis for describing mission readiness. In addition, resources spent estimating the cost of corrective action for a functional issue or deficiency is wasted if the SRM budget does not allow the corrective action to be performed. This leads to an assessment process that may not yield the expected results in terms of the resources that have been expended to complete the assessment. Thus, what is needed is a process that addresses data requirements in a cost effective and timely manner to quantify the capability of a facility to support a specific mission at any point in the lifecycle of a facility, including design, construction, utilization and modification.

BRIEF DESCRIPTION OF THE DRAWINGS

FIG. 9 is a screen print of a page of a software package that may be used as an evaluator's checklist for a Sub-issue Type in select embodiments of the present invention, provided for illustration purposes only.

DETAILED DESCRIPTION

In select embodiments of the present invention, a top-down, tiered, standardized data collection, recording and evaluation process establishes an objective measure of the functional capacity of an asset to address one or more specified uses. In general the process comprises: developing one or more lists of functionally impacted Sub-issue Types, d, and recording specific issues under each type that may impact functionality of the asset for the use; providing the list to one or more evaluators; employing the evaluator to use the list to evaluate functionality of the asset, such that the evaluator assigns a severity measure on a severity scale to each identified Sub-issue Type, d, and the evaluator records each occurrence of issues under each Sub-issue Type, d, associated with the asset, and sums the occurrences to determine Density of each Sub-issue Type, d; recording the evaluator's evaluation in one or more engineering management systems (EMS); and, using the recorded evaluation, calculating as the measure, a value to be inserted on a numerical scale as a functionality index, FI. In select embodiments of the present invention, the process employs a numerical scale with values from 0-100.

In select embodiments of the present invention, the process provides at least part of the evaluation as answers to questions in the lists.

In select embodiments of the present invention, the engineering management system is the BUILDER® application. Although examples below relate to buildings, engineering management systems related to pavements (PAVER™), railroads (RAILER™), transmission pipes (PIPER™), roofs (ROOFER™), and the like may also employ embodiments of the present invention.

In select embodiments of the present invention, the process provides for evaluating assets selected from types of assets that may comprise buildings, facilities, paving systems, roads, railways, airports, dams, roofing systems, athletic fields, pipelines, transmission lines, public utility systems, communications systems, combinations thereof, and the like.

Figure 10:
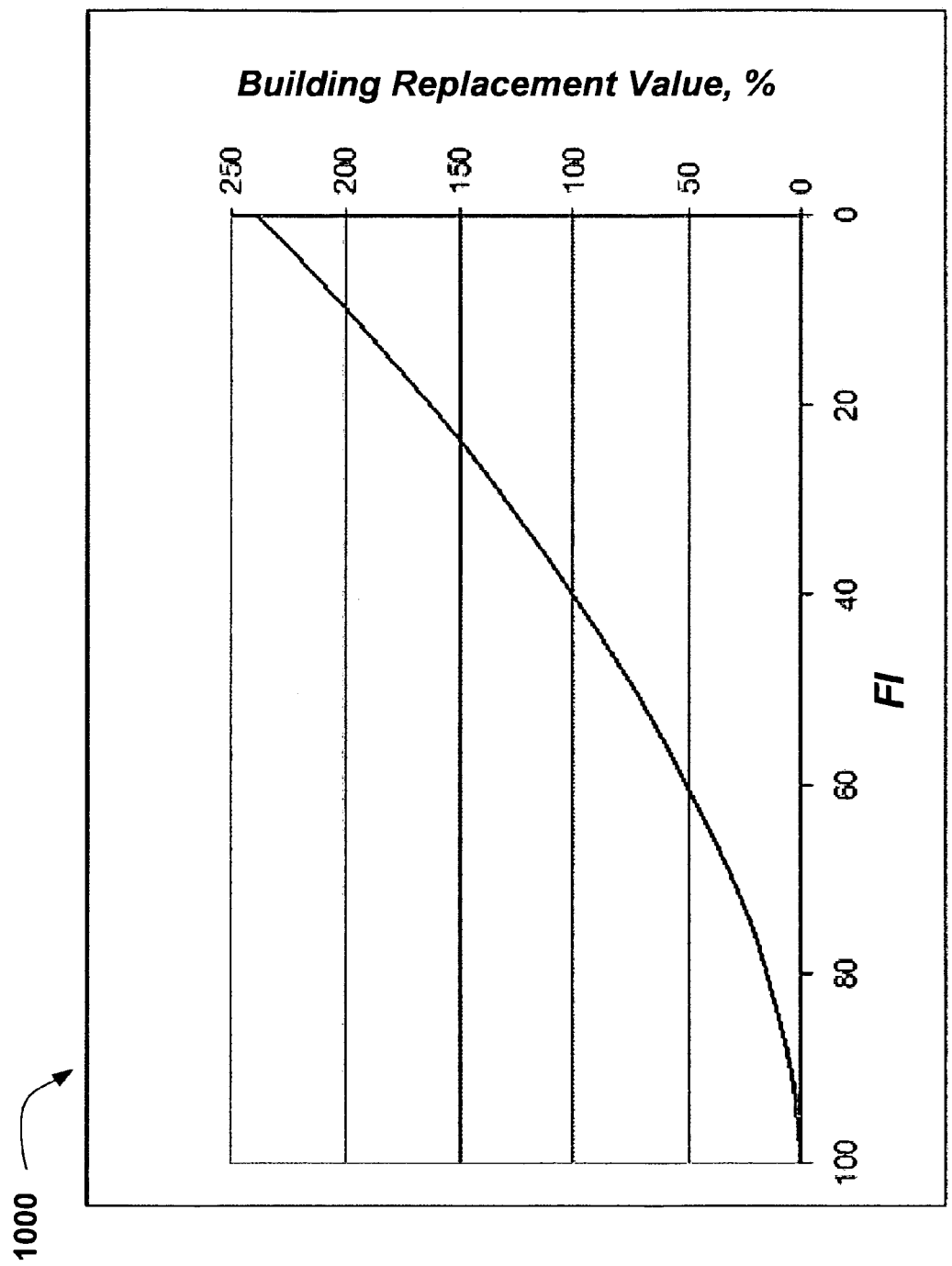
FIG. 10 is a graph of the objective Functional Index, FI, derived using embodiments of the present invention, versus percent replacement cost for an example asset.

In select embodiments of the present invention, the process further comprises generating one or more objective parametric cost estimates of modernization of the asset to correct one or more issues associated with the functional Sub-issue Types. Parametric cost estimating is a technique employing one or more Cost-Estimating Relationships (CERs) and associated algorithms and logic. The technique estimates the cost of the development, manufacture, or modification of an asset. Measurement is based on the technical, physical, or other characteristics of the asset. Parametric cost estimating links cost to an asset's technical parameters. Refer to FIG. 10, a graph 1000 of a parametric cost estimate for a specific example showing that when the facility is fully functional, i.e., FI is 100%, then the cost to modify is zero, but as FI drops to 40 on a scale of 100, the cost to modify is the replacement cost so any further modifications would not be economically viable. That is, a new facility could be built for the cost of modification. The disadvantage of further modifying a facility with an FI of less than 40 is readily apparent, the cost to modify approaching 2½ times the cost of replacement as the FI approaches zero.

In select embodiments of the present invention, the process further comprises combining the functionality index, FI, with a condition index, CI, to establish an objective measure of suitability of the asset for meeting a specified use. In select embodiments of the present invention, the process further comprises setting intervals on a severity scale such that the degrees of severity for the functionality index, FI, are consistent with those of a Condition Index (CI) scale used in the BUILDER® application.

In select embodiments of the present invention, the process yields an asset evaluation by completion of one or more facility surveys for each specified use of the asset.

In select embodiments of the present invention, the process further employs the functionality index, FI, to facilitate prioritizing work requirements.

In select embodiments of the present invention, the process further employs the functionality index, FI, to facilitate making investment decisions to choose from among alternative modernization configurations for the asset.

In select embodiments of the present invention, the process developing the functionality index, FI, for one or more uses of a typical asset, further comprises: researching, categorizing, and enumerating the functionality Sub-issue Types, d, and specific issues thereunder, as relates to obsolescence, user requirement changes, lost efficiency, codes and regulations compliance for a use of the typical asset and the like; providing one or more functionality rating sheets that explicitly define levels of functionality impact and sustainment, restoration, modernization (SRM) considerations at a number of discrete intervals along the scale of the functionality index, FI, such that the rating sheets delineate sections of the rating scale and the rating sheets facilitate evaluators in judging functionality scenarios, determining which interval is a best fit, and assigning a score within that interval; presenting the rating sheet, Sub-issue Types, d, and specific issues, together with a number of different functionality impact scenarios for one or more uses of an asset, to one or more panels of experts to provide functionality ratings reflecting the inability of the asset to meet the specified use, assuming existence of the Sub-issue Types and specific issues in the scenario, alone or in combinations thereof; using the panel's ratings to develop quantitative functionality deduct values, t, relationships and procedures for assessments by evaluators, and implementing the list in one or more engineering management systems as an assessment checklist for use by evaluators.

In select embodiments of the present invention, the process further comprises: organizing the ratings based on functionality Sub-issue Types, Severity, and Density; screening outliers; computing mean Deduct Values, t, for each Sub-issue Type-Severity-Density combination; plotting the Deduct Values, t, versus Density; and fitting the plotted data with a curve to mathematically describe the relationship of the Deduct Value, t, for each Sub-issue Type and Severity as a function of Density.

In select embodiments of the present invention, the process further develops the Deduct Value, t, to a statistical 95% confidence interval such that the resulting functionality index, FI, is ±5 points of true, attaining this accuracy by employing a minimum number of raters. In select embodiments of the present invention, the minimum number of raters is seventeen, on average.

In select embodiments of the present invention, the process applies a deduct adjustment to the sum, $\Sigma t_i$, of the individual Deduct Values, $t_i$, such that the deduct adjustment reflects the nonlinear effect on asset use of multiple functionality Sub-issue Types, d.

In select embodiments of the present invention, the process derives a deduct adjustment for calculating Adjusted Deduct Values, $t_a$, by: establishing one or more panels of expert raters; providing the raters with multiple scenarios, each scenario containing one or more functionality Sub-issue Types, d; using the raters to provide an overall rating for each scenario; establishing a plot of the sum, $\Sigma t_i$, of the individual Deduct Values, $t_i$, versus the direct rating value of each number of Sub-issue Types, e.g., 2, 3, 4, 5 for five total Sub-issue Types catalogued as presenting in the scenario, to obtain an appropriate deduct adjustment as represented by the slope of the plot for each number of functionality Sub-issue Types included in a given assessment, such that, depending on the nature and number of Sub-issue Types, d, the overall rating yields an Adjusted Deduct Value, $t_a$, less than the sum, $\Sigma t_i$, of the individual Sub-issue Type Deduct Values, $t_i$.

In select embodiments of the present invention, the process further provides one or more flowchart software interfaces in one or more engineering management systems.

In select embodiments of the present invention, the asset is a building. In select embodiments of the present invention, the engineering management system is the BUILDER® application.

In select embodiments of the present invention, the process is iterated for different uses of the asset.

In select embodiments of the present invention, the process encompasses three or more tiers. In select embodiments of the present invention, the process employs three tiers: asset level, system level, and component level, such that systems are parts of the asset and one or more components are parts of one or more systems and system and component levels provide refined estimates of the scope of required modernization, the component level providing the most refined estimate.

In select embodiments of the present invention, the process further organizes Sub-issue Types, d, into functionality categories, presenting each Sub-issue Type, d, as a question, evaluators answering questions for each Sub-issue Type, d, to determine the Density and severity at which the Sub-issue Type, d, impacts a specified use, such that the answers to the questions are used to determine a rating for the functionality category and to calculate a functionality index, FI. One or more of the answers may be based on observations of the evaluator with input from building users and maintenance personnel.

In select embodiments of the present invention, the process further employs the functional index, FI, as an execution metric establishing one or more thresholds, such that when the functionality index, FI, for an asset falls below a threshold, a requirement to modernize is generated.

Figure 8:
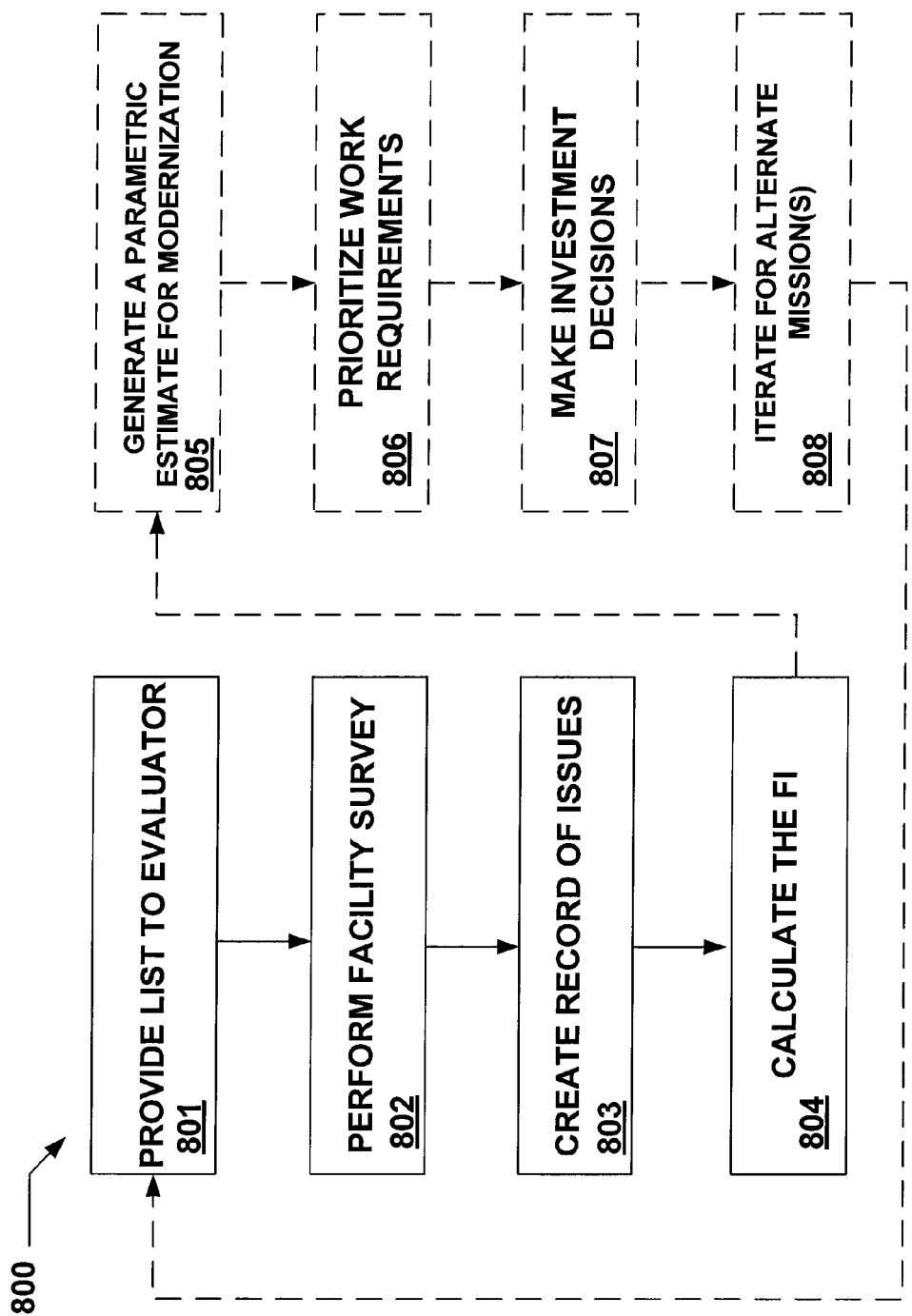
FIG. 8 is a flow chart of a process that may be used with select embodiments of the present invention to facilitate making investment decisions.

Refer to FIG. 8 describing a "Functionality Assessment" process 800 that may be implemented in using an embodiment of the present invention. One advantage of this approach is process standardization. An assessor (evaluator) is provided with an organized and logical list 801 of Sub-issue Types, d, 202 (see FIG. 2), and specific issues (or deficiencies) under each type, that impact functionality, e.g., that may lead to degraded functional capacity. Based on the assessor's completion of a facility survey 802 for the functional assessment 800, a record 803 is created of specific functional issues or deficiencies under each Sub-issue Type, d, 202 potentially requiring corrective action through modernization. Note: if corrective action could be accomplished through repair or refurbishment, then the deficiency would be in condition, not function. Further, the process provides for calculation 804 of an objective, repeatable, and scientifically-based functionality index (FI) metric that relates functional capability (capacity) on a numerical scale, such as 0-100. Among other benefits, this allows objective comparison among a portfolio of assets.

In select embodiments of the present invention, a system employs means for implementing a top-down, tiered, standardized data collection, recording and evaluation process for establishing an objective measure of the functional capacity of an asset to address one or more specified uses. The system comprises: means for developing one or more lists of functionally impacted Sub-issue Types, d, and specific issues under each Sub-issue Type, d, that may impact functionality of the asset for one or more specified uses; means for providing the list to one or more evaluators; means for employing evaluators to use the list to evaluate functionality of the asset, such that evaluators assign a severity measure on a severity scale to each Sub-issue Type, d, record occurrences of issues under each Sub-issue Type, d, associated with the asset, and occurrences of issues are summed to determine Density of the Sub-issue Type, d; means for recording an evaluator's evaluation in at least one engineering management system (EMS); and means for using the recorded evaluation to calculate as the measure a value to be inserted on a numerical scale as a functionality index, FI.

In select embodiments of the present invention, the system employs a numerical scale of values from 0-100.

In select embodiments of the present invention, the means for evaluation comprise at least answers to questions in the list.

In select embodiments of the present invention, the engineering management system is the BUILDER® application.

In select embodiments of the present invention, the system incorporates one or more custom algorithms to calculate the functionality index, FI.

In select embodiments of the present invention, the system generates one or more objective parametric cost estimates of modernization of the asset to correct one or more functional Sub-issue Types, d.

In select embodiments of the present invention, the system incorporates means to combine the functionality index, FI, with a condition index, CI, to establish an objective measure of suitability of the asset for meeting the specified use.

In select embodiments of the present invention, the system incorporates a severity scale upon which intervals are established such that degrees of severity are consistent with those of a Condition Index (CI) scale used in the BUILDER® application.

In select embodiments of the present invention, means for evaluation include one or more facility surveys for each specified use.

In select embodiments of the present invention, the system yields a functionality index, FI, that facilitates prioritizing work requirements. In select embodiments of the present invention, the system yields a functionality index, FI, that further facilitates making investment decisions to choose from among alternative modernization configurations for the asset.

In select embodiments of the present invention, the system facilitates development of a functionality index, FI, for one or more uses of a typical asset. In select embodiments of the present invention, the system further comprises: means for researching, categorizing, and enumerating functionality Sub-issue Types, d, and specific issues thereunder as relates to obsolescence, user requirement changes, lost efficiency, codes and regulations compliance for use of the typical asset, and the like; means for developing and providing one or more functionality rating sheets that explicitly define levels of functionality impact and SRM considerations at a number of discrete intervals along the scale of functionality index, FI, such that the rating sheets delineate sections of the rating scale and facilitate evaluators in judging functionality scenarios, determining which interval is a best fit, and assigning a score within the interval; means for presenting the rating sheet, Sub-issue Types, d, and specific issues, together with a number of different functionality impact scenarios for one or more uses of the asset, to one or more panels of experts to provide functionality ratings of impact to the asset's capacity for meeting the specified use, assuming the existence of one or more Sub-issue Types, d, and one or more issues thereunder; means for using the panel's ratings to develop quantitative functionality deduct value relationships and procedures for assessments by evaluators; and means for implementing the list in one or more engineering management systems as an assessment checklist for use by evaluators. Refer to FIG. 9 for one such checklist 900 for the ADA design requirements of a specific Sub-issue Type, d, as may be provided on a laptop computer for use on site by the evaluator.

In select embodiments of the present invention, the system incorporates means for researching, categorizing, and enumerating functionality Sub-issue Types, d, and issues thereunder. These means may be selected from the group comprising: manual searches, computerized searches, interviews, literature reviews, surveys, polls, combinations thereof, and the like.

In select embodiments of the present invention, means for using a panel's ratings to develop quantitative functionality deduct value relationships and procedures for assessments by evaluators may be selected from the group comprising: computers, software programs, custom algorithms, application specific integrated circuits (ASIC), combinations thereof, and the like.

In select embodiments of the present invention, the means for implementing the list in one or more engineering management systems as an assessment checklist for use by evaluators may be selected from the group comprising: electronic devices, personal digital assistants (PDA), laptop computers, computers, software programs, custom algorithms, application specific integrated circuits (ASIC), combinations thereof, and the like.

In select embodiments of the present invention, the system incorporates one or more flowchart software interfaces in the engineering management system.

In select embodiments of the present invention, the system facilitates a functionality assessment of a building. In select embodiments of the present invention, the engineering management system used with the system is the BUILDER® application.

In select embodiments of the present invention, the system further comprises: means for organizing ratings based on functionality Sub-issue Type, Severity, and Density; means for screening outliers; means for computing mean Deduct Values, t, for each Sub-issue Type-Severity-Density combination; means for plotting Deduct Values, t, versus Density; and means for fitting plotted data with a curve to mathematically describe the relationship of the Deduct Value, t, for each Sub-issue Type, d, and Severity as a function of Density.

In select embodiments of the present invention, the means for organizing ratings based on functionality Sub-issue Type, d, Severity, and Density may be selected from the group comprising: electronic devices, personal digital assistants (PDA), laptop computers, computers, software programs, custom algorithms, application specific integrated circuits (ASIC), combinations thereof, and the like.

In select embodiments of the present invention, the means for screening outliers may be selected from the group comprising: COTS software, laptop computers, computers, software programs, custom algorithms, application specific integrated circuits (ASIC), combinations thereof, and the like.

In select embodiments of the present invention, the means for computing mean Deduct Values, t, for each Sub-issue Type-Severity-Density combination may be selected from the group comprising: laptop computers, computers, software programs, custom algorithms, application specific integrated circuits (ASIC), combinations thereof, and the like.

In select embodiments of the present invention, the means for plotting Deduct Values, t, versus Density may be selected from the group comprising: COTS software, laptop computers, computers, software programs, custom algorithms, application specific integrated circuits (ASIC), combinations thereof, and the like.

In select embodiments of the present invention, the means for fitting plotted data with a curve to mathematically describe the relationship of the Deduct Value, t, for each Sub-issue Type, d, and Severity as a function of Density may be selected from the group comprising: COTS software, laptop computers, computers, software programs, custom algorithms, application specific integrated circuits (ASIC), combinations thereof, and the like.

In select embodiments of the present invention, the system further comprises means for developing the Deduct Value, t, to a statistical 95% confidence interval such that the resulting functionality index, FI, is ±5 points of true, attaining this accuracy by employing a minimum number of raters. In select embodiments of the present invention, the minimum number of raters is seventeen, on average.

In select embodiments of the present invention, the system incorporates means to apply one or more deduct adjustments to the sum, $\Sigma t_j$, of the individual Deduct Values, $t_i$, to reflect the nonlinear effect on asset use of multiple functionality Sub-issue Types, d.

In select embodiments of the present invention, the system incorporates means to derive the deduct adjustment for calculating Adjusted Deduct Values, $t_a$, comprising: means for establishing one or more panels of expert raters; means for providing the raters with multiple scenarios, each scenario containing one or more functionality Sub-issue Types, d; means for raters to provide an overall rating for each scenario; means for establishing a plot of the sum, $\Sigma t_j$, of individual Deduct Values, $t_i$, versus the direct rating value of each number of Sub-issue Types, d, e.g., 2, 3, 4, 5 for 5 Sub-issue Types, d, existing in an evaluation, to obtain an appropriate Adjusted Deduct Value, $t_a$, as represented by the slope of the plot for each number of functionality Sub-issue Types, d, existing in a given assessment, such that depending on the nature and number of Sub-issue Types, d, the overall rating yields an Adjusted Deduct Value, $t_a$, less than the sum, $\Sigma t_j$, of the individual Sub-issue Type Deduct Values, $t_i$.

In select embodiments of the present invention, means for establishing one or more panels of expert raters may be selected from the group comprising: requests for support of experts, direction to experts to serve, contracts for experts to serve, combinations thereof, and the like.

In select embodiments of the present invention, means for providing raters with multiple scenarios, each scenario containing one or more functionality Sub-issue Types, d, may be selected from the group comprising: laptop computers, computers, personal digital assistants (PDA), software programs, custom algorithms, application specific integrated circuits (ASIC), combinations thereof, and the like.

In select embodiments of the present invention, means for raters to provide an overall rating for each scenario may be selected from the group comprising: laptop computers, computers, personal digital assistants (PDA), software programs, custom algorithms, application specific integrated circuits (ASIC), combinations thereof, and the like.

In select embodiments of the present invention, means for establishing a plot of the sum, $\Sigma t_i$, of individual Deduct Values, $t_i$, versus the direct rating value of each number of Sub-issue Types, d, may be selected from the group comprising: COTS software, laptop computers, computers, software programs, custom algorithms, application specific integrated circuits (ASIC), combinations thereof, and the like.

In select embodiments of the present invention, the system may iterate the process for different uses of the asset.

In select embodiments of the present invention, the system employs a tiered process encompassing three or more tiers. In select embodiments of the present invention, the system employs three tiers: asset level, system level, and component level, such that systems are parts of assets and one or more components are parts of one or more systems and system and component levels provide refined estimates of the scope of required modernization, the component level providing the most refined estimate.

In select embodiments of the present invention, means are provided for organizing Sub-issue Types, d, within functionality categories or Types, T, presenting each Sub-issue Type, d, thereunder as a question, an evaluator answering each question to facilitate determining Density and Severity at which Sub-issue Types, d, impact the specified use, such that the answers yield a rating for a functionality category, in turn facilitating calculation of the Functionality Index, FI. One or more of the answers may be based on observations of evaluators combined with input from building users and maintenance personnel.

In select embodiments of the present invention, means for developing comprise one or more panels of experts.

In select embodiments of the present invention, means for providing the list to one or more evaluators may be selected from the group comprising: electronic communications, mail, hand delivery, combinations thereof, and the like.

In select embodiments of the present invention, means for employing evaluators to use the list to evaluate functionality of the asset may be selected from the group comprising: directions to an employee, hiring of a contractor, combinations thereof, and the like.

In select embodiments of the present invention, means for recording an evaluator's evaluation in one or more engineering management systems may be selected from the group comprising: electronic devices, manual transcription, laptop computers, personal digital assistants (PDA), computers, barcode readers, purpose-built electronic instruments, combinations thereof, and the like.

In select embodiments of the present invention, means for using a recorded evaluation to calculate the Functionality Index, FI, may be selected from the group comprising: custom algorithms, application specific integrated circuits (ASIC), electronic devices, laptop computers, personal digital assistants (PDA), computers, purpose-built electronic instruments, combinations thereof, and the like.

Figure 1:
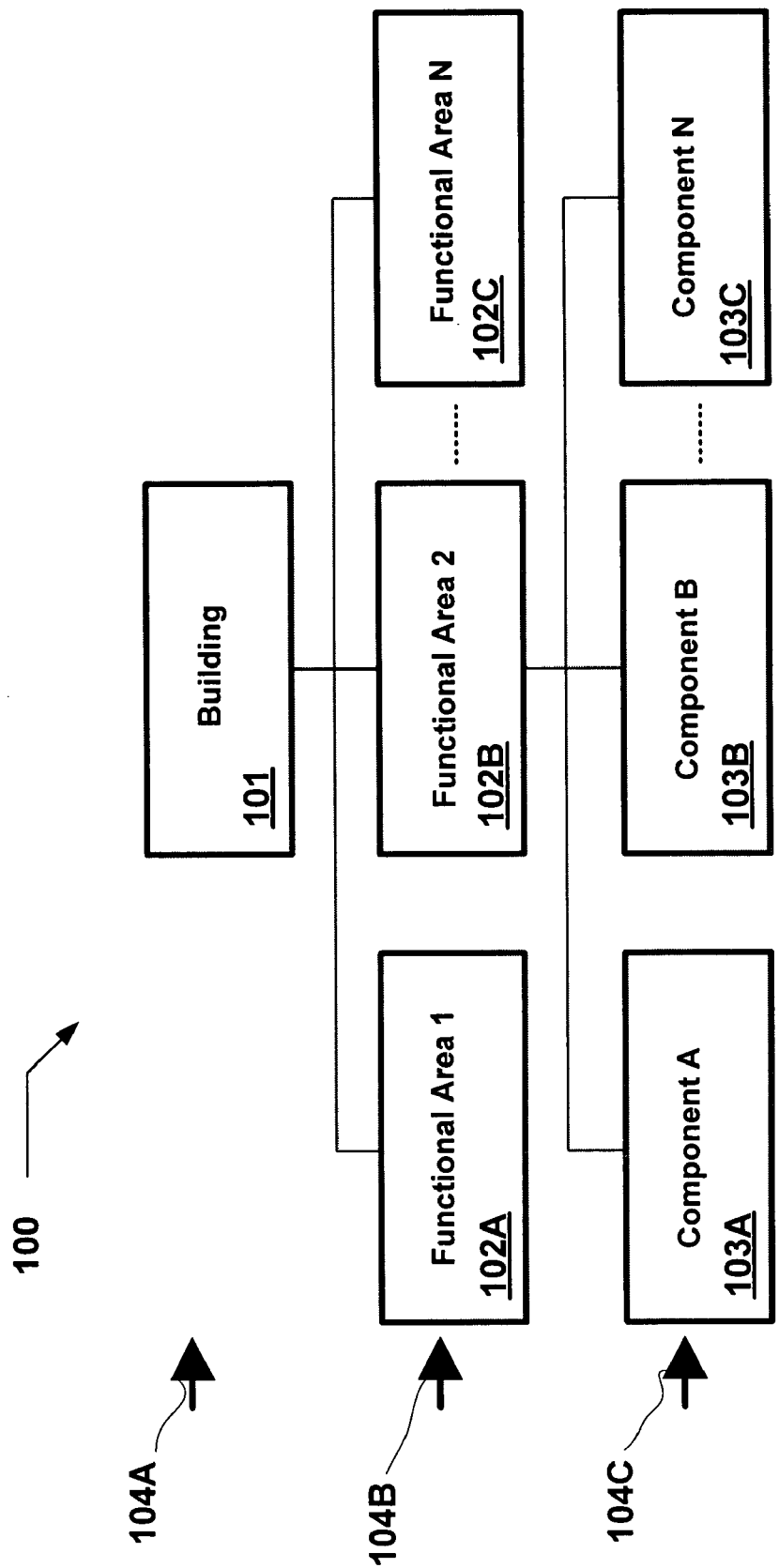
FIG. 1 depicts levels of assessment that may be used with select embodiments of the present invention.

To serve as a meaningful communication tool and metric, a building functionality score needs to be consistent, objective, and repeatable when used by various assessors. Achieving this objectivity requires a standardized evaluation and data collection and recording process. To be viable to implement, the data collection process needs to be efficient with the minimum amount of assessment time required. To accomplish this, a top-down tiered approach is developed to narrow the focus and assure greater assessment detail is applied to priority issues or problems. This approach saves effort, reduces cost, and focuses attention where needed. It also allows the identification and development of modernization requirements to efficiently flow from a broad strategic planning phase to a detailed tactical planning phase. This assessment approach 100 encompasses three levels 104A, B, C as shown in FIG. 1 depicting the Tiered Functionality Assessment Process 100 of select embodiments of the present invention.

Each tier 104A, 104B, 104C in the assessment is focused on a specific level of detail in the building hierarchy. A next lower level provides a more refined estimate of the scope of re-capitalization (modernization) work requirements.

A Level 1 assessment 104A evaluates functionality of the Building overall as a top level functionality assessment 101 of the building. A parametric cost model may be implemented to use the resulting FI 201 (FIG. 2) and compute a scoping cost estimate to modernize the building as a whole. (Note: "as a whole" does not necessarily mean the entire building requires modernization. Rather, the building as a whole is being evaluated and the modernization requirements for the entire building, whatever scope they may be, will be identified.)

A Level 2 assessment 104B evaluates the functional areas 102A, B, C, a medium level assessment tailored to designated functional areas, systems or spaces of the building. A parametric cost model may take the resulting FI 201 and scope a cost estimate to modernize specific building functional areas.

A Level 3 assessment 104C evaluates Components 103A, B, C, as shown in FIG. 1 for functional area 102B only. This is a detailed assessment of specific components or component sections. This assessment refines the scope of work and cost to those specific affected components and component sections.

A Level 1, or high-level, assessment 104A is performed to determine the overall functional suitability of the building for supporting a given mission. If this high-level assessment 104A determines the facility to be well suited to support the mission, then additional or more detailed assessments are not needed again until changes in user requirements, building codes, and the like. If the Level 1 assessment 104A reveals issues or potential issues, then a more detailed Level 2 assessment 104B may be performed to evaluate specific functional areas of the building. This additional detail provides a full description of the "issue." (Note: Issues are defined with respect to a mission, not with respect to building "problems" un-associated with a mission. An "issue" for one mission may not even be a "concern" for another mission, while an "issue" for a third mission may be a serious "deficiency." Thus the term "issue" is dependent on the mission of the facility and is used as a "best fit" descriptor of items that may represent at least a cause for concern, dependent on the specific mission being supported. The term is used as a "classifier" for purposes of developing an embodiment of the present invention, not as an absolute description of an "identified item's" potential impact on the building. Thus an item that is termed an "issue" in an embodiment of the present invention could be a deficiency for one mission and of little or no concern to another.) If modernization is planned or scheduled to address these functional issues, then a detailed Level 3 assessment 104C may be employed to identify those individual systems, components, or sections that are suspect and in need of modification or replacement.

A Level 1 104A functionality rating scopes a quick building wide assessment of suitability to support a given mission. For example, it looks at issues of functionality that impact the "currently assessed mission" of the building as a whole. Level 1 assessments 104A do not address specifically what is, or may be, deficient. Rather, these assessments do not highlight satisfactory performance areas while highlighting those functional areas, including systems or components in some cases, that are, or may be, deficient based solely on the nature of the issue as it relates to the mission needing to be accomplished. At this level, this is done without a detailed functional issue assessment.

In select embodiments of the present invention, the Level 1 104A functionality assessment addresses fourteen discrete functionality categories, or issues, that may adversely impact a given mission of a facility as shown in Table 1. These categories relate to user requirements, technical obsolescence, and legal requirements including building codes and regulations.

sion support is not possible with conventional assessment processes.

To validate select embodiments of the present invention, functionality impact issues related to building obsolescence, user requirement changes, lost efficiency, and building codes and regulations compliance were rigorously researched and categorized. These functionality issues were presented to a panel of building experts to rate the overall building functionality impact. Data were used to develop functionality Deduct Value relationships, $a(d_i, S_j, D_{ij})$, and procedures for assessments. A process was computerized in the BUILDER® Version 3.0 pre-release application. This included the design of an assessment checklist and software interface flowchart.

Example

BUILDER® is a software program that automates an engineering management system (EMS) that may be used for all entities that manage or assess buildings for fitness of use, space planning, and the like. As well, it provides decision makers objective data for evaluating investment potential. The "Building Functionality Assessment Process," an example of which is given in FIG. 8, and the resultant calculated "Functionality Index (FI)" metric, FI 201, of an embodiment of the present invention may be used with BUILDER® to manage building assets efficiently.

TABLE 1

Building Functionality "Issue" Categories

| # | CATEGORY | DESCRIPTION |
|---|---|---|
| 1 | Location | Building placement related to mission accomplishment |
| 2 | Size/Configuration | Suitability of the size and layout of the building |
| 3 | Structural Adequacy | Suitability for supporting environmental and mission loads |
| 4 | Access | Suitability for supporting occupant mobility |
| 5 | ADA | Compliance with Americans with Disabilities Act |
| 6 | ATFP | Compliance with Anti-Terrorism/Fire Protection requirements |
| 7 | Building Services | Utilities, communications, security and fuel distribution |
| 8 | Comfort | HVAC, temperature, humidity, noise and lighting |
| 9 | Efficiency/Obsolescence | Energy efficiency, water conservation, HVAC zoning |
| 10 | Environmental/Health | Asbestos, lead paint, air quality, fire protection, and the like |
| 11 | Inadequate Components | Necessary and correct components are installed |
| 12 | Aesthetics | Interior and exterior building appearance |
| 13 | Maintainability | Ease of maintenance of operational equipment |
| 14 | Cultural | Cultural resources and historic significance of the building |

Figure 2:
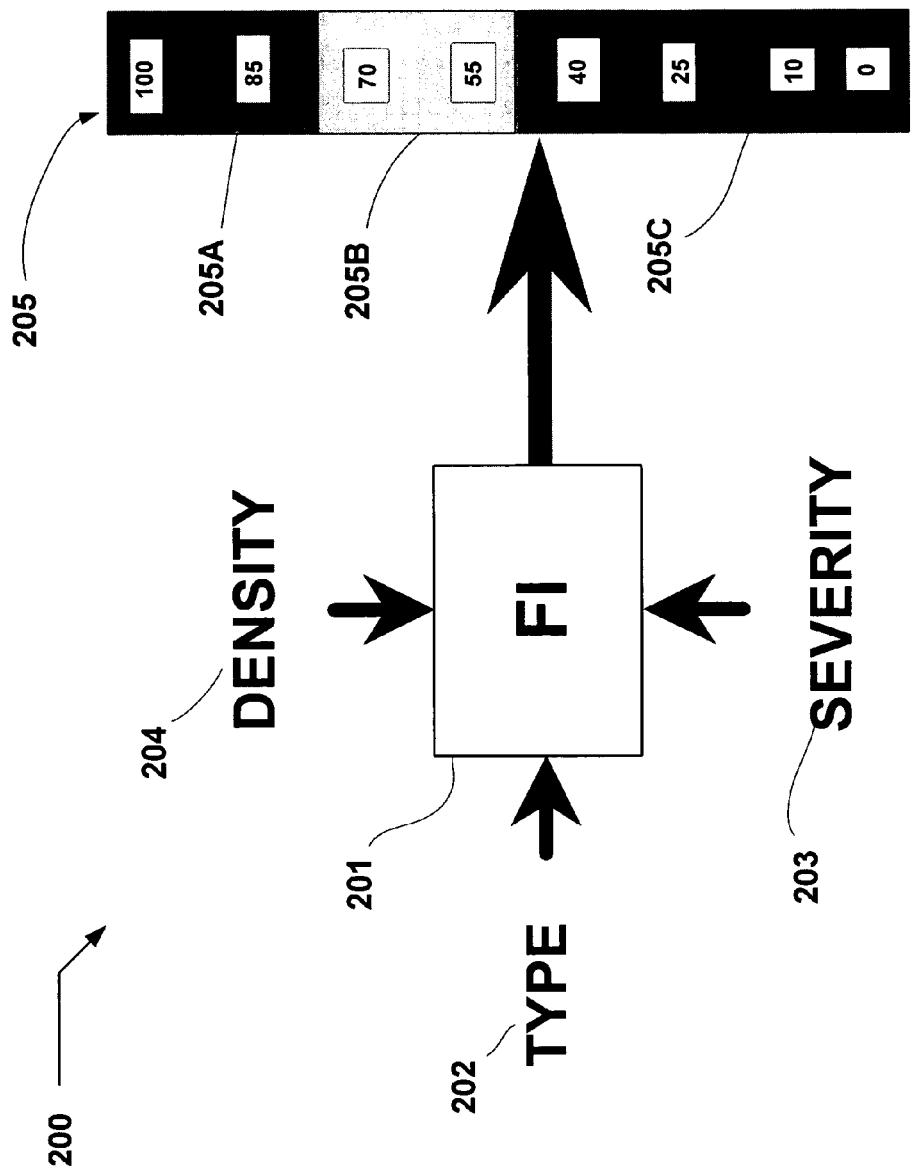
FIG. 2 graphically represents the elements used to calculate a functional index (FI) for select embodiments of the present invention.

As shown on the right side of FIG. 8, just one use of the FI, 201 (FIG. 2), may be to generate an objective parametric cost estimate of modernization 805 to correct specific functional issues or deficiencies within the various Sub-issue Types, d 202 (FIG. 2). The FI-based parametric estimate is much quicker and less expensive to obtain than a detailed engineering cost estimate. The FI, 201, may also facilitate prioritizing work requirements 806 and making investment decisions 807 to choose among the options of sustainment, modernization, restoration (SRM) and new construction. This process 800 allows decision makers to look at alternatives, iterating 808 the process and weighing the cost of each alternative with the respective level of occupancy quality and mission support that each is capable of providing. This type of objective deci- To help facility managers make informed infrastructure investment decisions on an objective basis, a building's "functionality state" has to be quantifiable, measurable, and reviewable over time. The FI 201 of select embodiments of the present invention, as may be used in the BUILDER® EMS application, supports SRM facility infrastructure investment decisions.

To quantify the functionality state of a building, in select embodiments of the present invention, the functionality metric, FI 201, is developed. For consistency, FI 201 employs the same guidelines as the Condition Index (CI) of BUILDER® developed for buildings, as well as for similar EMS's for pavements, roofs, pipelines, railroad track structure, and the like. In select embodiments of the present invention, the FI scale ranges from 0-100 with definitions of the intervals on the scale described in Table 2 below.

TABLE 2

Description of Functionality Index (FI) Rating Intervals

| FI | DESCRIPTION |
|---|---|
| 100 | No functionality problems exist in building. |
| 86-99 | Building, as a whole, is only slightly functionally impaired. |
| 71-85 | Building, as a whole, is functionally impaired but only to a minor degree. |
| 56-70 | Building, as a whole, is functionally impaired to a moderate degree. |
| 41-55 | Building, as a whole, is functionally impaired to a significant degree. |
| 26-40 | Building, as a whole, is functionally impaired to an extensive degree. |
| 11-25 | Building, as a whole, is barely able to serve its intended or proposed use. |
| 0-10 | Building is totally unable to serve its intended or proposed use. |

The intervals on the scale are set such that the degrees of Severity are consistent with those of the Condition Index (CI) scale used in BUILDER® and similar EMS's developed by the U.S. Army Corps of Engineers. In a manner similar to the CI, the FI 201 quantitatively and objectively establishes the functional suitability of the building to support a specified mission. Functional assessments, unlike condition assessments, may not be performed without knowledge of the mission to be met by the facility.

Associated with each functionality "issue" category or type, T, are specific Sub-issue Types, d, thereunder. For an older facility, the Environmental/Health issue category, T, may include: asbestos, air quality, radon, lead paint, and the like. These Sub-issue Types, d, are mission-defined and impact the functionality of the building to perform a specific mission, affecting its capability to support that mission in a safe and efficient manner. The number of Sub-Issue types, d, considered with the extent (Density 204) and significance (Severity 203) of each type, is used to establish the functionality rating or index, FI 201, for a given mission of a facility.

Refer to FIG. 2, depicting a generalized Functionality Index (FI) Model 200. In select embodiments of the present invention, the "degree" (quantitative amount) of functionality impact, i.e., the Functionality Index (FI) 201, may be established by considering individual issue categories, T, further divided into Functionality Sub-issue Types, d 202, and two attributes, Severity 203 and Density 204, for each Sub-issue Type, d 202. The manner in which the Sub-issue Type, d 202, affects mission, to include regulatory compliance, comfort, safety and the like, establishes Severity 203. How widespread the Sub-issue Type, d 202, is within the facility establishes Density 204.

In select embodiments of the present invention, to perform a Level 1 assessment 104A, an evaluator completes a facility level (i.e., Building 101) functionality questionnaire. The questionnaire considers each Sub-issue Type, d 202, of interest, e.g., those in Table 1, and assigns each to fall within one of a representative group of ranges of FI ratings, e.g., a group of ranges designated as green 205A, amber 205B, and red 205C. This "captures" the impact on support to a given mission of individual Functionality Sub-issue Types, d 202.

Refer to FIG. 2. In select embodiments of the present invention, the FI 201 may be indicated on a "thermometer" 205 indicating quantified measures of suitability in ranges such that a top range 205A may have a green background indicating satisfactory to support the specified mission, a middle range 205B may have an amber background indicating satisfactory for most purposes or marginal for selected mission support purposes, and a lowest range 205C that may have a red background, indicating marginal or unsatisfactory capability to support the specified mission. Specific definitions of color-coded ranges may be:

Green—Building fully complies and is suitable to support the specified mission.

Amber—One or more Sub-issue Types, d, impact suitability to support the specified mission but only marginally.

Red—One or more Sub-issue Types, d, impact suitability to support the specified mission, putting the mission at risk.

N/A—A Sub-issue Type, d, does not apply for this specified mission or building.

In select embodiments of the present invention, combining a specific Sub-issue Type, d 202, its Severity 203, and Density 204 results in a functionality deduct value, t, that is used in a weighted deduct value-Density model to compute the FI 201. The weighted deduct value-density model is based on the relationship:

$$FI = 100 - \sum_{i=1}^{I} \sum_{j=1}^{J} a(d_i, S_j, D_{ij}) \times F(t, d) \qquad (1)$$

Where:
FI=Functionality Index metric 201
I=Total number of individual functionality Sub-issue Types, d 202
J=Total number of individual Severity 203 levels present for $i^{th}$ Sub-issue Type, d 202
$a(d_i, S_j, D_{ij})$=Functionality Deduct Value for Sub-Issue Type 202, d, Severity 203, S, and Density 204, D.
F(t,d)=Adjustment Factor when multiple Sub-issue Types, d 202, are present, based on the sum of individual Deduct Values, t, and number of Sub-issue Types, d 202.

In select embodiments of the present invention, by applying rating scale theory, the FI 201 approximates the rating obtained by the use of a panel of expert raters. In effect, the rating scale "validates" the functionality issues with meaningful numerical functionality indexes at appropriate assessment levels. The raters are employed in a rigidly controlled rating session setting. To develop the FI 201 using this method, a number of assumptions are made:

functionality is a measurable attribute;

raters are capable of making quantitative judgments about functionality;

the judgment of each rater may be expressed directly on an interval scale;

variability of judgment is a random error;

raters are interchangeable; and average individual rating values may be used to estimate rating scale values.

In select embodiments of the present invention, during a rating session, raters are presented with a number of different functionality impact scenarios for a facility supporting a specified mission. The mission may be the original mission, a current mission or a proposed mission. To separate the concept of condition from the functionality metric, raters are instructed not to consider condition as a reason for functionality impact. Functionality impact scenarios are used to address one or more functionality Sub-issue Types, d 202, of varying Severity 203 and Density 204. For select embodiments of the present invention, Table 3 lists the specific Sub-issue Types, d 202, as questions associated with each of the functionality categories listed in Table 1. Each rater is asked to rate the overall building functionality based on the Sub-issue Types, d 202, existing in each scenario. This rating is on a 0-100 scale and is based on the guidelines discussed above for establishing the framework of the FI 201.

For implementing select embodiments of the present invention, panel members are given a Functionality Rating Sheet, an example of which is shown in Table 4. This sheet explicitly defines levels of building functionality loss and SRM considerations at a number of discrete intervals along the functionality index (FI) scale. This sheet delineates these intervals along the rating scale. This allows raters to judge any functionality scenario, determine which interval is the best fit, and then assign a score within that interval. Adherence to the guidelines of the rating sheet ensures consistency and reduces error.

Figure 3:
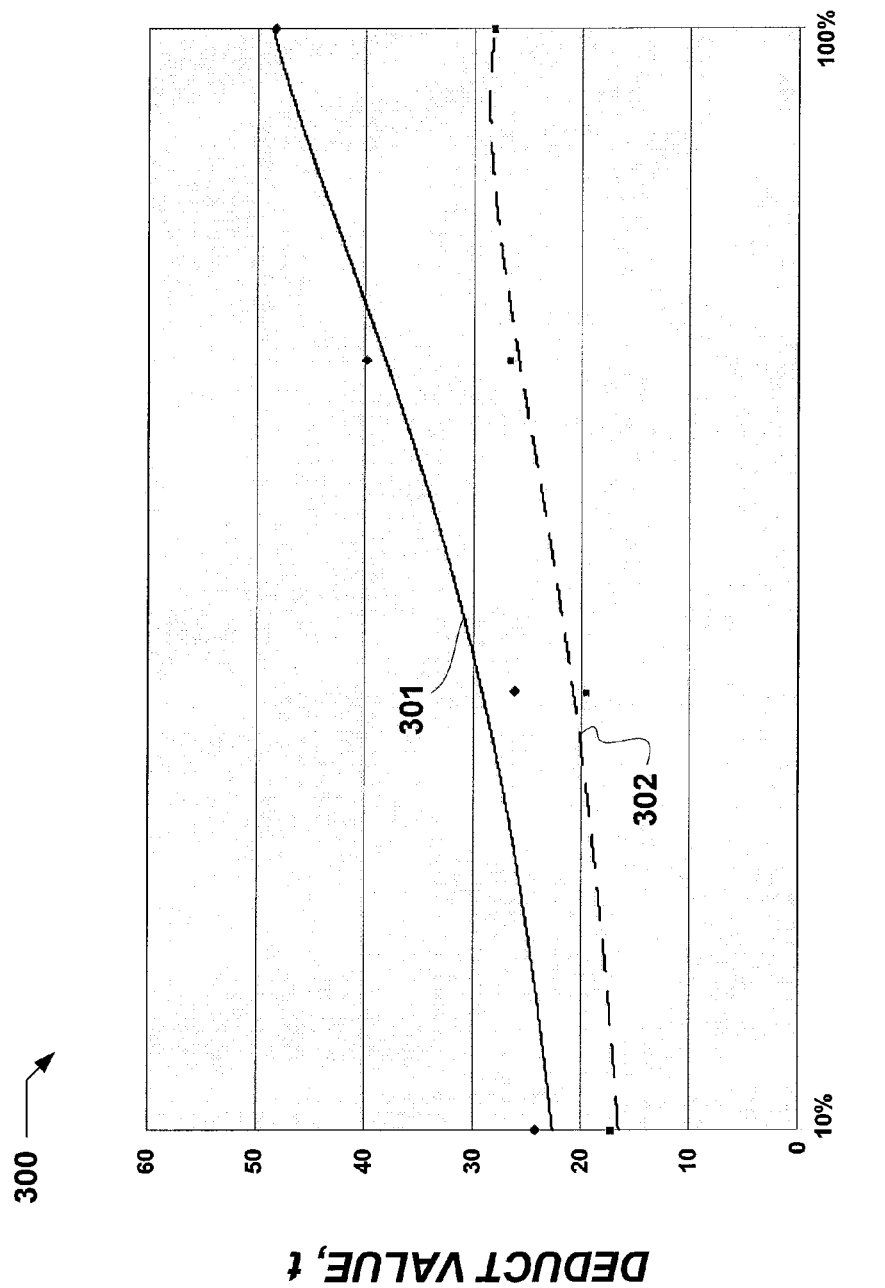
FIG. 3 is a graph depicting Deduct Value versus Density of Sub-issue Types for two separate categories of Sub-issue Types as used in select embodiments of the present invention.

In select embodiments of the present invention, functionality rating data from the panel are compiled to develop models for translating functionality issues into quantitative Deduct Values, t. Results are organized based on functionality Sub-issue Type, d 202, Severity 203, and Density 204. Outliers are screened and mean Deduct Values, t, are computed for each Sub-issue Type-Severity-Density combination. Deduct Values, t, are then plotted and fitted with a curve to mathematically describe the relationship of the Deduct Value, t, for a Sub-issue Type, d 202, and Severity 203 as a function of Density 204 as shown in FIG. 3.

TABLE 3

Building Functionality Sub-issue Types, d, by Functionality Category, T

1 LOCATION
   Is the building located in a floodplain?
   Is the building located in an airfield safety clearance?
   Is the building located in the explosive arc distance?
   Is the building located near sources of excessive noise?
   Is the building adequately located to support the mission?
2 BUILDING SIZE AND CONFIGURATION
   Does the building encourage an appropriate level of occupant interaction?
   Is the building overcrowded?
   Is the building configuration adequate?
3 STRUCTURAL ADEQUACY
   Is the building structurally adequate for seismic conditions?
   Is the building structurally adequate for all loading conditions?
4 ACCESS
   Is entry into the building quick and easy?
   Is directional, informational, and room signage in and around the building adequate?
   Is exit (egress) from the building quick and easy?
5 ADA
   Is the building ADA compliant?
6 ATFP
   Does the building meet ATFP requirements and recommendations?
7 BUILDING SERVICES
   Is the internal power supply adequate?
   Is the uninterruptible power supply adequate?
   Is the water supply adequate?
   Is the hot water supply adequate?
   Is the specialty water supply adequate?
   Are the plumbing fixtures adequate?

TABLE 3-continued

Building Functionality Sub-issue Types, d, by Functionality Category, T

Is the stand-alone wastewater removal system adequate?
   Is the industrial waste removal system adequate?
   Is the information technology system adequate?
   Is the fuel distribution system adequate?
   Is the oxygen (or other gas) system adequate?
   Is the compressed air system adequate?
   Is the security system adequate?
   Is the telephone system adequate?
   Is the capacity of the electrical distribution system adequate?
   Is the electrical system grounded adequately?
   Is the electrical system grounded adequately?
   Are the electrical outlets adequate?
8 COMFORT
   Does the building have the HVAC capacity to be heated adequately?
   Does the building have the HVAC capacity to be cooled adequately?
   Does the building have the HVAC capacity to be dehumidified adequately?
   Does the building have the HVAC capacity to be humidified adequately?
   Does the building have the HVAC capacity to be ventilated adequately?
   Are HVAC controls adequate?
   Is there disruptive noise in the building?
   Is the building adequately lit?
   Are the lighting controls adequate?
9 EFFICIENCY/OBSOLESCENCE
   Is the equipment energy efficient?
   Is the building adequately zoned for HVAC?
   Are efficient lightning controls in use and adequate where applicable?
   Are efficient lighting fixtures in use and adequate where applicable?
   Are water conservation mechanisms in use and adequate where applicable?
   Are energy efficient windows and doors in use and adequate where applicable?
   Does the insulation meet building requirement?
10 ENVIRONMENTAL/HEALTH
   Is the lightning protection adequate?
   Is asbestos present in the building?
   Is the indoor air quality of the building adequate?
   Is lead paint present in the building?
   Is lead present in the building's water?
   Are PCB's present in the building?
   Is radon present in the building?
   Is the fire and smoke detection/warning system adequate?
   Are flammable and combustible materials adequately stored?
   Is the fire suppression equipment adequate?
11 MISSING OR IMPROPER COMPONENTS
   Are all the necessary components present?
   Is the correct type of each component present?
12 AESTHETICS
   Does the quality and appearance of the exterior create a positive impression on the public and the building occupants?
   Does the quality and appearance of the interior create a positive impression on the public and the building occupants?
13 MAINTAINABILITY
   Does the design and placement of equipment allow for easy maintenence?
14 CULTURAL RESOURCES
   Does this building have any cultural resources or historical significance?

TABLE 4

Rating Sheet for Evaluators and Related Modernization Needs

| FI | RATING DEFINITION | MODERNIZATION NEEDS |
|---|---|---|
| 100 | No functionality problems exist in building. All user requirements are met, no component-sections are obsolete, and the building is in full compliance with all codes and regulations. | None |

TABLE 4-continued

Rating Sheet for Evaluators and Related Modernization Needs

| FI | RATING DEFINITION | MODERNIZATION NEEDS |
|---|---|---|
| 86-99 | One or more, up to a very few, non-critical or critical component-sections suffer from varying degrees of functionality loss; and/or Up to a small number of component-section inventory items suffer from varying degrees of functionality loss; and/or One or more building functional areas are experiencing slight functional impairment; and/or Building, as a whole, is only slightly functionally impaired. | Up to total modernization desired or required for up to a few component-sections or few inventory items (i.e. items that collectively make up a component-section) for given component-sections; or Minor modernization desired or required to certain building functional areas; or Building relocation is an option under certain circumstances. |
| 71-85 | More than a very few, but not many, non-critical or critical component-sections suffer from varying degrees of functionality loss; or combinations of a few non-critical and critical component-sections suffer from varying degrees of functionality loss, and/or Many component-section inventory items are experiencing varying degrees of functionality loss; and/or One or more building functional areas are experiencing minor functional impairment, and/or Building, as a whole, is functionally impaired but only to a minor degree. | |
| 56-70 | Many, non-critical and critical component-sections suffer from varying degrees of functionality loss; and/or Large numbers of component-section inventory items are experiencing varying degrees of functionality loss, and/or One or more critical building functional areas are experiencing moderate functional loss and other building functional areas may be experiencing functional loss to a moderate or a lesser degree; and/or Building, as a whole, is functionally impaired to a moderate degree. | Up to total modernization required to significant numbers of component-sections or the inventory items for given component-sections; or Significant modernization required to one or more building functional areas; or major modernization required to small building portions; or Building relocation desired, but not required. |
| 41-55 | One or more critical building functional areas are experiencing significant functional loss and other building functional areas may be experiencing functional loss to a significant or lesser degree; and/or Building, as a whole, is functionally impaired to a significant degree. | |
| 26-40 | One or more critical building functional areas are experiencing extensive functional loss and other building functional areas may be experiencing functional loss to an extensive or lesser degree; and/or Building, as a whole, is functionally impaired to an extensive degree. | |
| 11-25 | The majority of building functional areas is experiencing a functional loss to some degree with one or more being severe (total or nearly so); or Building, as a whole, is barely able to serve its intended or proposed use. | Major modernization required to large portions of or the entire building; or Building relocation required. |
| 0-10 | Building is totally unable to serve its intended or proposed use. | |

Refer to FIG. 3, showing a graph 300 of Deduct Values, t, versus percent Density 204 for a given Sub-issue Type, d 202, and Severity 203. Functionality Deduct Curves 301, 302 are illustrated for Red and Amber configuration issue conditions, respectively. No curves are needed for the Green condition as that is a satisfactory rating. In select embodiments of the present invention, Functionality Deduct Curves 301, 302 are developed to a statistical 95% confidence interval that the resulting FI 201 is ±5 points of true. To attain this accuracy, a minimum number of raters are required. On average, statistical sample sizes of seventeen raters are required. In select embodiments of the present invention, nineteen raters are used on average.

When multiple Sub-issue Types, d 202, exist, their cumulative functionality impact is not the arithmetic sum of individual Sub-issue Types, d 202. If it were, the presence of several Sub-issue Types, d 202, simultaneously could result in the FI 201 being less than zero, exceeding the bounds of the metric. Consider also the "psychophysics" aspect that reduces the influence of any given Sub-issue Type, d 202, when additional Sub-issue Types, d 202, exist. (Psychophysics describes how an organism (rater) uses its sensory systems to detect events in its environment. The processes of the sensory systems are of interest rather than their structure or physiology.) Therefore, a Deduct Adjustment Factor, F(t d), is applied to the sum, $\Sigma t_i$, of the individual Deduct Values, $t_i$, to reflect the nonlinear effect on a mission of cumulative functionality Sub-issue Types, d 202.

Figure 4:
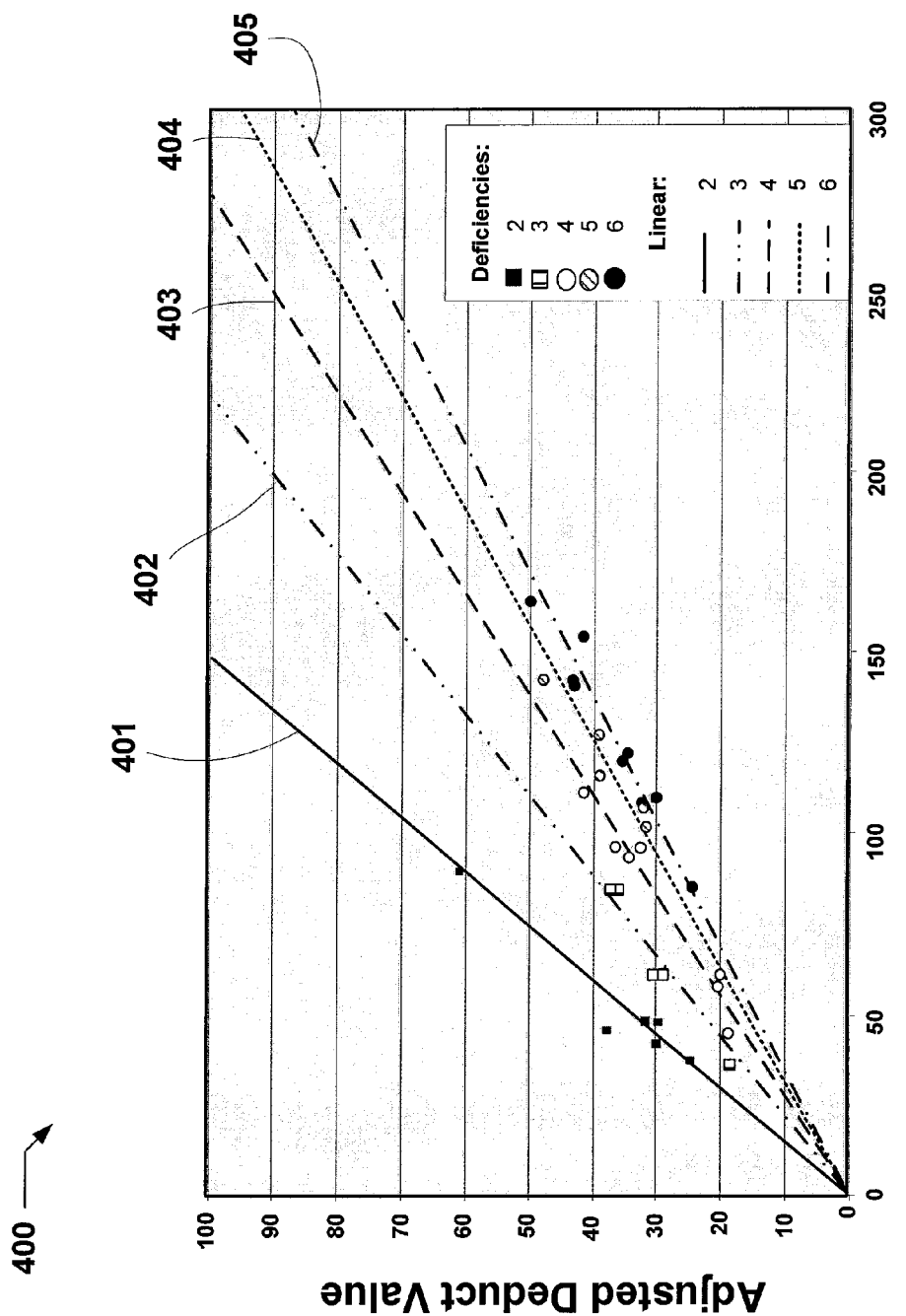
FIG. 4 is a graph depicting Adjusted Deduct value versus Sum of Individual Deduct Values for each of five different numbers of Sub-issue Types as used in select embodiments of the present invention.

Refer to FIG. 4, a graph 400 depicting one plot each of the Sum of Individual Deduct Values versus Adjusted Deduct Values, $t_a$, for 2 401, 3 402, 4 403, 5 404, and 6 405 Sub-issue Types, d 202, from which correction factors may be derived. In select embodiments of the present invention, Adjusted Deduct Values, $t_a$, are derived by providing an expert panel of raters with several scenarios containing multiple functionality Sub-issue Types, d 202, as in the above example of FIG. 4 with 2, 3, 4, 5 and 6 Sub-issue Types, d 202. Depending on the nature and number of Sub-issue Types, d 202, an overall rating yields a functionality Deduct Value, $a(d_i, S_j, T_{ij})$, less than the sum, $\Sigma t_i$, of the individual Sub-issue Type Deduct Values, $t_i$. By plotting the sum, $\Sigma t_i$, of the individual Deduct values, $t_i$, versus the direct rating value of the combined multiple Sub-issue Types, d 202, a correction factor represented by the slope of the appropriate line 401, 402, 403, 404, 405 may be defined individually for each number of Sub-issue Types, d 202, present in a given assessment.

In select embodiments of the present invention, the data models for the Functionality Deduct Curves 401, 402, 403, 404, 405 and the "multiple Sub-issue Type" adjustment factors are stored in the BUILDER® EMS system libraries. This allows for automatic calculation of the FI 201 by collecting and recording the applicable functionality Sub-issue Types, d 202.

Figure 5:
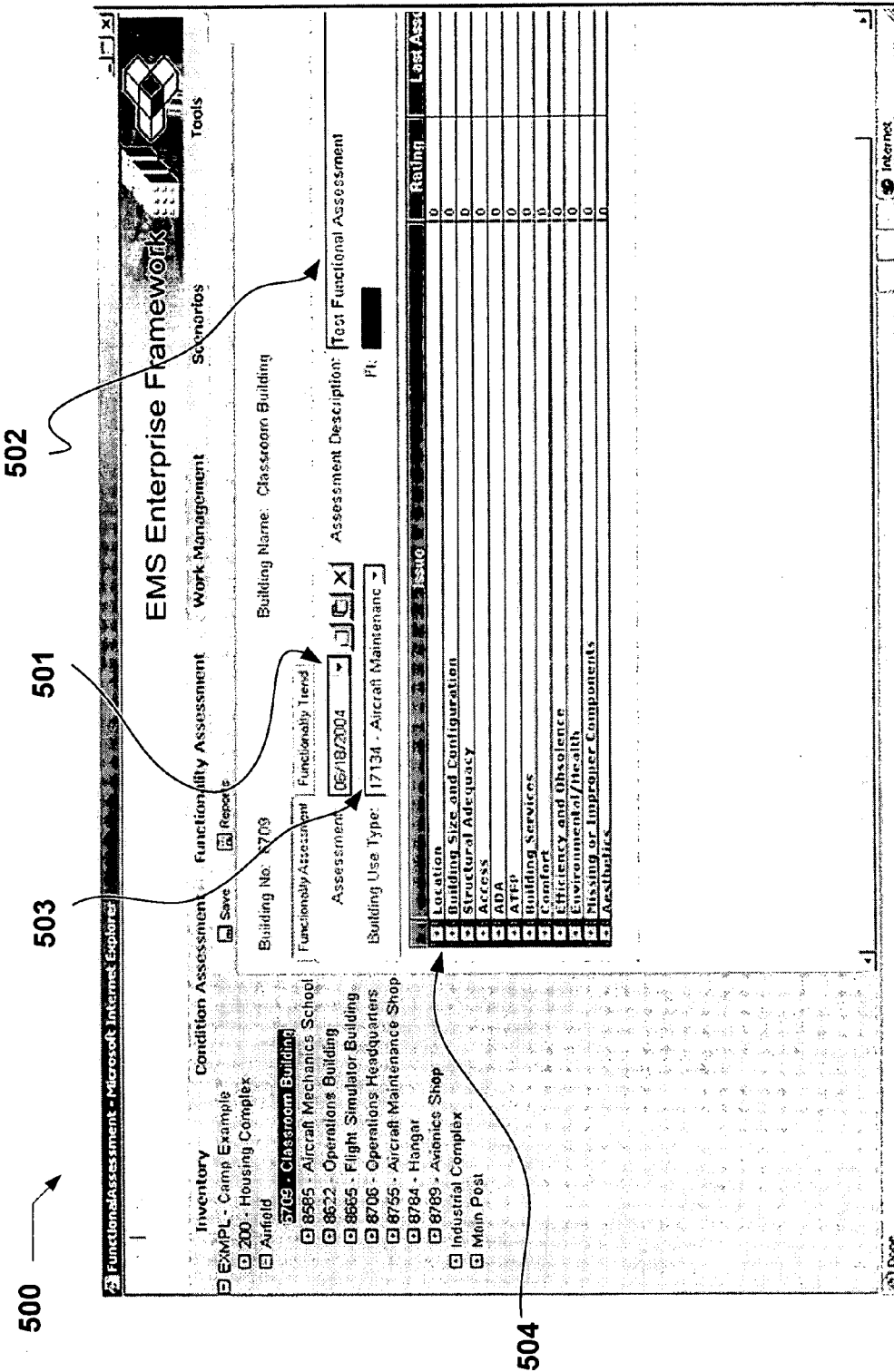
FIG. 5 is a screen print of a first page of a software package that may be used in select embodiments of the present invention, provided for illustration purposes only.

Refer to FIG. 5, a "screen print" 500 of the Functionality Assessment screen in BUILDER®, shown for illustration purposes only. At the Level (Tier) 1 assessment level 104A, one or more functionality assessments 100 are performed, depending on the number of alternative missions to be supported. Each assessment 100 is stored by date 501 as a separate record with a description 502. In addition, the building use type (specific mission supported) 503 for which that building's functionality was evaluated is also recorded. The "use type" 503 defines the "evaluated" mission supported by the building. Multiple use types 503 may be listed for a given building, thus assuming, for rating purposes, multiple possible missions to support. Thus, the building functionality may be assessed for its current use or for alternative to potential uses. Additionally, the list of 14 functionality issue categories, T 504, provided in Table 1 is available on this screen.

Figure 6:
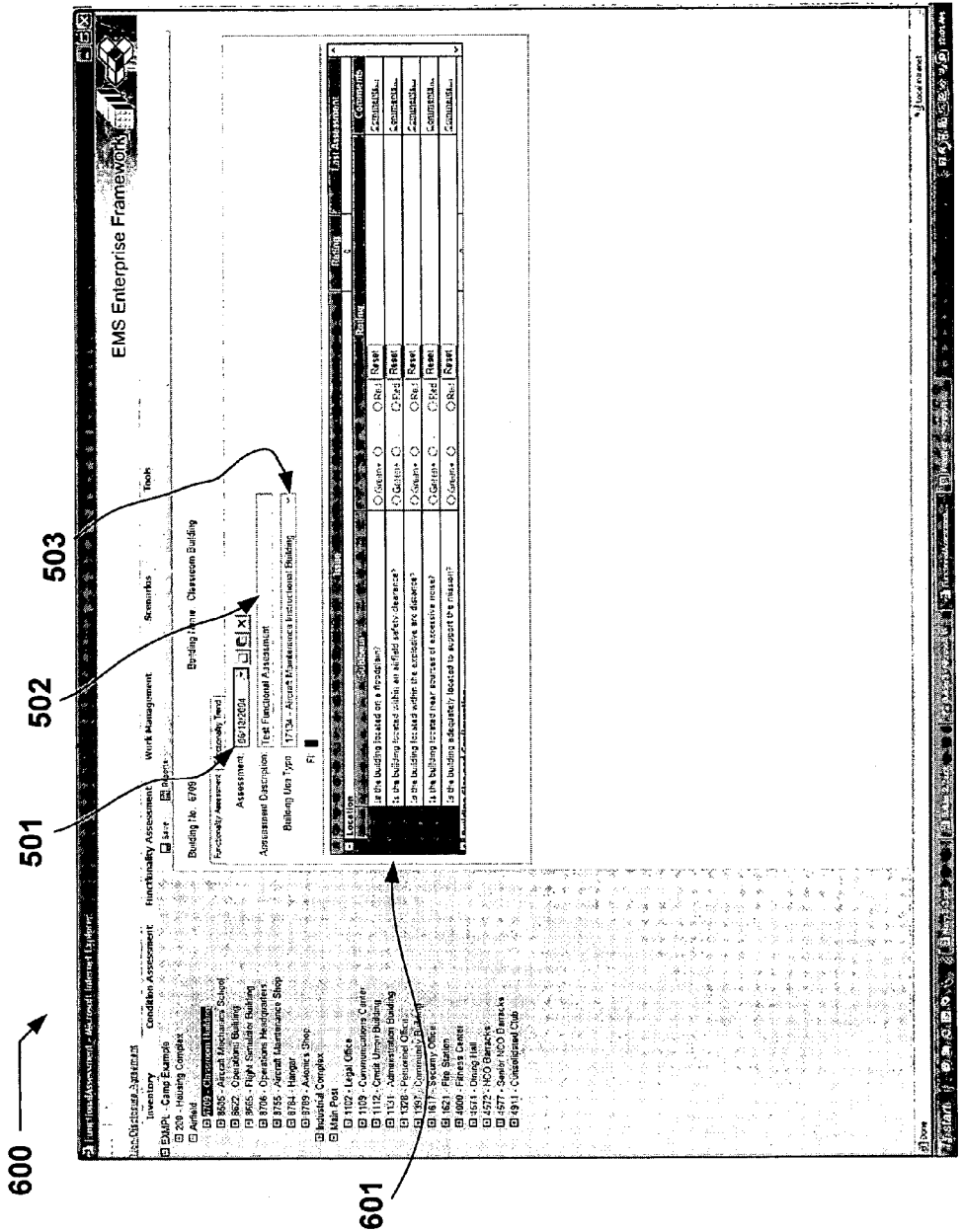
FIG. 6 is a screen print of a second page of a software package that may be used in select embodiments of the present invention, provided for illustration purposes only.

Refer to FIG. 6. In select embodiments of the present invention, during the Level 1 functionality assessment 104A, each of these categories, T 504, may be expanded to show the Sub-issue Types, d 202, relevant for each. FIG. 6 shows the Sub-issue Types, d 202 associated with the "Location" issue category (Issue Type) 601. Each of these Sub-issue Types, d 202, is presented as a question that the evaluator answers to determine the Density 204 and Severity 203 at which each individual Sub-Issue Type, d 202, impacts support of a mission. The answers to these questions determine the rating for the functionality category, T 504, and are used to calculate the FI 201. In select embodiments of the present invention, the "answers" (objective ratings) are based on observations of a "functionality evaluator," with input from building users and maintenance personnel, as appropriate. The completion of the evaluation provides a consistent, repeatable and objective metric of functionality, FI 201, that is used to estimate the suitability of the facility to support a designated or planned use, i.e., mission, depending on the questions initially asked.

The FI 201 is important to the SRM decision making process because it is an objective indicator. In select embodiments of the present invention, the FI 201 indicates how suitable the facility's inherent characteristics (size, location, configuration, and the like) are for supporting its designated mission, including the safety and overall well-being of the building occupants. As planners evaluate different scenarios, the FI 201, and functionality assessment procedure 100 used to develop it, are practical tools for establishing the capabilities of existing infrastructure.

In select embodiments of the present invention, the FI 201 serves a dual role, as both an evaluation and an execution metric. One use as an execution metric involves establishing thresholds. When the functionality index, FI 201, for a building falls below some minimum threshold standard, modernization requirements may be generated. Because the FI 201 is an objective metric, it provides quantifiable justification of modernization needs. Additionally, in select embodiments of the present invention, the FI 201 may be used to parametrically estimate the cost of building modernization as further discussed below.

Figure 7:
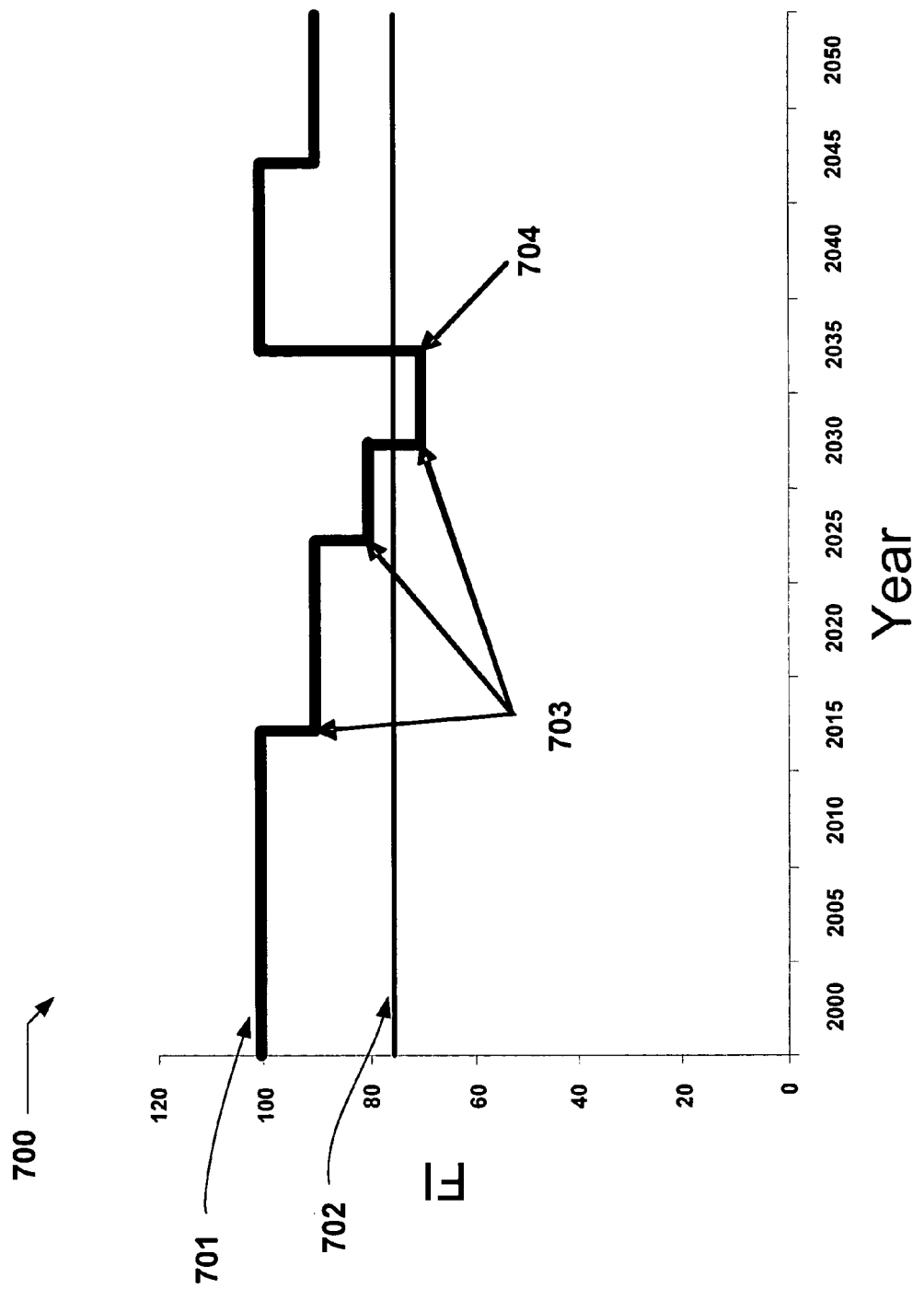
FIG. 7 is a graph plotting the functional index (FI) of select embodiments of the present invention versus time for a single facility, illustrating value to decision makers, as may be displayed in select embodiments of the present invention.

Refer to FIG. 7, an example 700 of the change in FI 201 as may be plotted over time to implement the FI 201 as an execution metric. The plot 701 exhibits discrete decreases 703 in FI 201 that may be due to a number of causes as diverse as change in mission, technology, communications advances requiring re-wiring, and the like. Although the "discrete decreases" in performance do not occur all at once, they are measured at a specific time via an assay or inspection and their measurement is indicated at a discrete moment in time. At some point a threshold 702 is reached at which the asset is no longer suitable to meet mission requirements. At some time after passing the threshold 702, modernization 704 of the asset is undertaken to enable it to support its current mission, and perhaps a new mission as foreseen for the near term.

In select embodiments of the present invention, in addition to determining functionality requirements for an asset's current purpose, users may also perform functionality assessments to determine future requirements for a potential new mission. For example, military base closures may require a mission (along with the supporting resources of people, material, and equipment) to be transferred to other bases. The functional characteristics of existing buildings on the new bases may be assessed to measure their ability to support a new mission. This may occur if a new type of aircraft is to be stationed at the base and hangar modernization is required to support it. Multiple scenarios for different missions and building configurations may be run. Applying results of these evaluations to modernization requirements, projected modernization resources may be optimized.

In select embodiments of the present invention, an asset's FI 201 and CI are used to objectively quantify justification for rehabilitation or modernization. This includes comparing cost of restoration and modernization versus demolition and new construction. With this objective information about condition and functionality, work plans may be developed based on sound investment strategies, prioritization criteria, and budget constraints. Leveraging the capabilities of the BUILDER® EMS, simulations may be run to show the future impact of current SRM decisions on buildings, for example. In select embodiments of the present invention, the FI 201 implemented in BUILDER® and like software provides a proactive means of asset management based on an objective metric.

Summarizing some of the salient features provided by employing select embodiments of the present invention:

An objective metric, i.e., the FI 201, may be provided to facilitate evaluation of an asset's ability to meet one or more missions based solely on its functionality.

A range of functionality Sub-issue Types, d 202, may be categorized in a reasonable list that an evaluator may use to assess an asset's functional capability to address a given mission or missions.

A Severity 203 and Density 204 may be associated with each Sub-issue Type, d 202, or potential Sub-issue Type, d 202, that may impact an asset's support of a specified mission and be linked to a specific deduct value, t, in the calculation of an objective metric.

Deduct values, t, may be adjusted as appropriate where multiple functionality Sub-issue Types, d 202, present during an assay.

Functionality may be assessed based on one or more potential or anticipated missions for an asset such as may be initiated by a change in user requirements.

An objective Functionality Index metric, FI 201, may be calculated for an asset and correlated directly to an estimated modernization cost.

Use of the FI 201 may be combined with a Condition Index, CI, to provide a complete estimate of an asset's capability to support a given mission.

It is therefore to be understood that within the scope of the appended claims, the invention may be practiced otherwise than as described. Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The abstract is provided to comply with the rules requiring an abstract that will allow a searcher to quickly ascertain the subject matter of the technical disclosure of any patent issued from this disclosure. Any advantages and benefits described may not apply to all embodiments of the invention.

We claim:

1. A method employing a top-down, tiered, standardized data collection, recording and evaluation process for establishing an objective measure of the functional capacity of an asset to address at least one specified use, comprising:

providing at least one specially adapted electronic processor;

providing electronically readable storage media accessible to said at least one specially adapted electronic processor;

providing at least one engineering management system (EMS) accessible on said electronically readable storage media accessible by said at least one specially adapted electronic processor;

using said at least one specially adapted electronic processor to develop at least one list of functional impact Categories and specific Sub-issue Types thereunder that impact functionality of said asset for each said at least one specified use, said at least one list of functional impact Categories and specific Sub-issue Types thereunder stored on said electronically readable storage media;

using said at least one specially adapted electronic processor to display said list of functional impact Categories and specific Sub-issue Types to at least one evaluator;

using said at least one specially adapted electronic processor to develop at least one question for each of said functional impact Categories;

providing said at least one list of functional impact Categories, specific Sub-issue Types thereunder and said at least one question for each of said functional impact Categories on said at least one specially adapted electronic processor for use by at least said at least one evaluator;

using said at least one specially adapted electronic processor to permit said at least one evaluator to use said list of functional impact Categories and specific Sub-issue Types thereunder and said at least one question for each of said functional impact Categories in an evaluation to evaluate functionality of said asset by observing issues of said asset;

recording on at least one said at least one specially adapted electronic processor occurrences of said issues under a corresponding said Sub-issue Type;

using said at least one specially adapted electronic processor to assign a Severity level, S, on a Severity scale to each said Sub-issue Type upon said recording of all said issues for each said Sub-issue Type;

summing on said at least one specially adapted electronic processor, occurrences of said issues by Sub-issue Type to determine a Density, D, of said Sub-issue Type;

using said at least one specially adapted electronic processor to record said evaluator's evaluation in said at least one engineering management system (EMS); and using said recorded evaluation, employing at least one algorithm which takes into account a functionality deduct value and adjustment factor on at least one said at least one specially adapted electronic processor to calculate as said objective measure a numerical value as a functionality index, FI; and using said functionality index to evaluate said asset.

2. The method of claim 1 providing said numerical value on a scale from 0-100.

3. The method of claim 1 providing at least part of said evaluation as answers to said at least one question for each of said functional impact Categories.

4. The method of claim 1 providing said engineering management system as an application for evaluating buildings.

5. The method of claim 1 providing one said at least one algorithm as:

$$FI = 100 - \sum_{i=1}^{I} \sum_{j=1}^{J} a(d_i, S_j, D_{ij}) \times F(t, d)$$

Where:

I=Total no. of individual functionality said Sub-issue Types, d

J=Total number of individual said Severity levels, S, present for $i^{th}$ said Sub-issue Type, d $a(d_i, S_j, D_{ij})$=Functionality Deduct Value for said Sub-Issue Type, d, said Severity, S, and said Density, D F(t,d)=Adjustment factor when multiple said Sub-issue Types are present based on the sum of individual Deduct Values, t, and number of said Sub-issue Types, d.

6. The method of claim 1 evaluating said assets selected from types of assets consisting of: buildings, facilities, paving systems, roads, railways, airports, dams, roofing systems, athletic fields, pipelines, transmission lines, public utility systems, communications systems, and combinations thereof.

7. The method of claim 1 further comprising generating at least one objective parametric cost estimate of modernization of said asset to correct at least one said issue from a said functional Sub-issue Type.

8. The method of claim 5 further pairing said functionality index, FI, with a condition index, CI, to establish an objective measure of suitability of said asset for meeting said specified use.

9. The method of claim 8 further comprising setting intervals on said Severity scale such that said levels of Severity are consistent with levels of Severity of a scale used with said Condition Index (CI) used in said application for evaluating buildings.

10. The method of claim 1 providing said evaluation by completing at least one facility survey for each said specified use.

11. The method of claim 1 further comprising:
establishing a list of assets for which said functionality index, FI, has been calculated for at least one use for each said asset on said list of assets; and
prioritizing work requirements for each said asset on said list of assets based on said calculated functionality indexes, FI.

12. The method of claim 11 further comprising:
based on said calculated functionality indexes, FI, choosing one modernization configuration from among alternative modernization configurations for at least one said asset on said list of assets.

13. The method of claim 1, employing said at least one specially adapted electronic processor to at least collect and record data for calculating said functionality index, FI, for at least one use of said asset, further comprising:
collecting and recording at least data on obsolescence, user requirement changes, efficiency, and code and regulation compliance for said at least one use of said asset as relates to at least one said functional impact Category and at least one said Sub-issue Type;
categorizing said at least one functional impact Category;
enumerating said at least one Sub-issue Type for at least one said functional impact Category;
employing said at least one specially adapted electronic processor to produce at least one functionality rating sheet;
defining said levels of functionality impact to include lists of sustainment, restoration, modernization (SRM) considerations at a discrete intervals along said scale;
delineating said intervals of said scale on said rating sheet; and
using said rating sheet in determining which said interval is a best fit;
assigning a score within said interval;
presenting said rating sheet, said enumerated functional impact Categories and said enumerated Sub-issue Types, together with at least one functionality impact scenario for at least one said use of said asset, to at least one panel of experts to generate at least one functionality impact rating of said asset to meet said at least one use, given the presence of at least one said Sub-issue Type;
using said functionality impact ratings to develop quantitative functionality deduct value relationships and procedures for assessment by said panel of experts; and
employing said enumerated list of functional impact Categories and said at least one enumerated Sub-issue Type as questions to be incorporated in at least one engineering management system as an assessment tool for use by said at least one panel of experts to establish ratings.

14. The method of claim 13 further comprising:
organizing said ratings based on said functionality Sub-issue Type, said Severity, and said Density;
screening outliers of said ratings;
computing mean Deduct Values, t, for each Sub-issue Type-Severity-Density combination;
plotting said mean Deduct Values, t, versus said Density; and
fitting said plotted data with a curve to mathematically describe the relationship of said Deduct Value for each said Sub-issue Type and Severity as a function of said Density.

15. The method of claim 14 further comprising:
developing said Deduct Value to a statistical 95% confidence interval such that the resulting said functionality index, FI, is within ±5 points of true; and
to attain this accuracy, requiring employment of a minimum number of said experts on said at least one panel of experts.

16. The method of claim 15 providing said minimum number of said experts as at least seventeen, on average.

17. The method of claim 14 applying at least one deduct adjustment to the sum of the individual Deduct Values, said deduct adjustment reflecting the nonlinear effect on said asset use due to existence of multiple said Sub-issue Types.

18. The method of claim 17, deriving said deduct adjustment for calculating Adjusted Deduct Values by:
establishing at least one panel of expert raters;
providing said at least one panel of expert raters with multiple scenarios, each said scenario containing at least one said Sub-issue Type;
having said at least one panel of expert raters to provide an overall rating for each said scenario;
establishing a plot of a sum of said individual Deduct Values versus a direct rating value of each quantity of said Sub-issue Types to yield an appropriate said deduct adjustment as represented by the slope of said plot for each discrete said quantity of said Sub-issue Types present in said overall rating for each said scenario, said overall rating yielding said Adjusted Deduct Values less than the sum of said individual Sub-issue Type Deduct Values.

19. The method of claim 13 further providing at least one software interface flowchart in said at least one engineering management system.

20. The method of claim 1 further comprising iterating said process for each a said at least one use different from a first said at least one specified use.

21. The method of claim 1 encompassing at least three tiers.

22. The method of claim 21 further comprising:
establishing said tiers as asset level, system level, and component level, said systems comprising parts of said asset and comprised of at least one said component, and
evaluating down to said system and said component levels to provide refined estimates of required modernization, said component level providing most refined said estimates of required modernization.

23. The method of claim 1 further comprising:
presenting each said Sub-issue Type as a question, said at least one evaluator providing answers to said question for each said Sub-issue Type to permit determining said Density and Severity at which said Sub-issue Type impacts said at least one specified use;
receiving input from users of said asset and personnel responsible for maintenance of said asset to supplement observations of said evaluator in completing said answers; and
using said answers to at least partially determine a rating for a corresponding said functionality impact Category and as input to calculate said functionality index, FI.

24. The method of claim 1 further comprising:
employing said functionality index, FI, as an execution metric, use as said execution metric establishing at least one threshold for said functionality index, FI; and
generating a requirement to modernize when said FI for said asset falls below said threshold.

25. The method of claim 1 further comprising providing said at least one specially adapted electronic processor selected from the group consisting of: laptop computers, computers, specially programmed computers, personal digital assistants (PDA), application specific integrated circuits (ASIC), and combinations thereof.

26. A system employing a top-down, tiered, standardized data collection, recording and evaluation process for establishing an objective measure of the functional capacity of an asset to address at least one specified use, comprising:

at least one specially adapted electronic processor, said at least one specially adapted electronic processor facilitating development of means at least one list of functional impact Categories and Sub-issue Types thereunder, answers to questions within said Sub-issue Types facilitating determination of functionality of said asset for said use;

at least one engineering management system (EMS) accessible to said at least one specially adapted electronic processor;

at least one communications system to provide said list of functional impact Categories and Sub-issue Types to at least one evaluator; and a combination of hardware and software accessible to said specially adapted electronic processor and having at least the following purposes:

to facilitate use by said at least one evaluator of said list of functional impact Categories and Sub-issue Types to produce at least one evaluation of functionality of said asset, for said at least one evaluator to assign a Severity measure on a Severity scale to each existing said Sub-issue Type, for said at least one evaluator to record occurrences of issues associated with said asset under at least one said Sub-issue Type, for summing said occurrences of issues to determine Density of at least one said Sub-issue Type, for recording said at least one evaluation in said at least one engineering management system (EMS), and for using said recorded at least one evaluation to calculate as said objective measure a numerical value as a functionality index, FI.

27. The system of claim 26 in which said numerical scale has values from 0-100.

28. The system of claim 26 in which at least part of said at least one evaluation are said answers to at least one question for each of said Categories.

29. The system of claim 26 in which said engineering management system is an application for evaluating buildings.

30. The system of claim 26 in which said assets are selected from types of assets consisting of: buildings, facilities, paving systems, roads, railways, airports, dams, roofing systems, athletic fields, pipelines, transmission lines, public utility systems, communications systems, and combinations thereof.

31. The system of claim 26, said at least one communications system further comprising at least one electronic communications device in operable communication with said at least one specially adapted electronic processor and accessible to said at least one evaluator, further comprising at least one panel of experts to facilitate at least said development of at least one list of Sub-issue Types.

32. The system of claim 26 in which said communications system for providing said list of functional impact Categories and Sub-issue Types to said at least one evaluator is selected from the group consisting of: electronic communications, mail, hand delivery, and combinations thereof.

33. The system of claim 26 in which said recording of said evaluator's evaluation in said at least one engineering management system is facilitated by devices selected from the group consisting of: electronic devices, laptop computers, personal digital assistants (PDA), computers, barcode readers, purpose-built electronic instruments, and combinations thereof.

34. The system of claim 26 in which said combination of hardware and software for using said recorded evaluation to calculate as said measure a value to be inserted on a numerical scale as a functionality index, FI, is selected from the group consisting of: custom algorithms, application specific integrated circuits (ASIC), electronic devices, laptop computers, personal digital assistants (PDA), computers, purpose-built electronic instruments, and combinations thereof.

35. The system of claim 26 in which said functionality index, FI, is developed for a specified use of an asset, further comprising:

said at least one recorded evaluation further comprising specially developed databases for researching, categorizing, and enumerating said Sub-issue Types and specific issues as relate to at least obsolescence, user requirement changes, efficiency, and code and regulation compliance for said specified use of said asset;

at least one functionality rating sheet that explicitly defines levels of functionality impact and sustainment, restoration, modernization (SRM) considerations at a number of discrete intervals along said scale of said functionality index, FI, said rating sheet delineating specified ranges at intervals along said rating scale, said rating sheet facilitating said at least one evaluator in judging functionality scenarios, determining which said interval is a best fit, and assigning a score within said interval;

at least one display of said rating sheet, Sub-issue Types and specific issues, together with a number of different functionality impact scenarios for at least one use of said asset, for use by said at least one panel of experts to provide functionality impact ratings of said asset in meeting said use, given the presence of at least one said Sub-issue Types;

at least one algorithm contained on said electronically readable storage media accessible by said specially adapted electronic processor for using said ratings to develop quantitative functionality deduct value relationships; at least one checklist of procedures for use of said at least one evaluators in assessment; and at least one assessment checklist in said at least one engineering management system for use by said at least one evaluators.

36. The system of claim 35 in which said specially developed databases for researching, categorizing, and enumerating said Sub-issue Types and specific issues are stored on said electronically readable storage media as input from sources selected from the group consisting of: manual searches, computerized searches, interviews, literature reviews, surveys, polls, and combinations thereof.

37. The system of claim 35 incorporating at least one software interface flowchart in said at least one engineering management system.

38. The system of claim 35 said combination of hardware and software further providing software at least incorporating specially programmed algorithms for:

organizing said ratings based on said Sub-issue Type, said Severity, and said Density;

screening outliers;

computing mean Deduct Values for each Sub-issue Type-Severity-Density combination;

plotting said Deduct Values versus said Density; and fitting said plotted data with a curve to mathematically describe the relationship of said Deduct Value for each said Sub-issue Type and Severity as a function of said Density.

39. The system of claim 35 in which said minimum number of experts is at least seventeen, on average.

40. The system of claim 38 providing a deduct adjustment for calculating Adjusted Deduct Values by:
   providing at least one panel of expert raters;
   providing said electronically readable storage media incorporating at least one scenario, each said scenario containing at least one said functionality Sub-issue type, said expert raters to provide an overall rating for each said scenario;
   providing said electronically readable storage media further incorporating a plot of said sum of said individual Deduct Values versus the direct rating value of each number of said Sub-issue Types to obtain an appropriate said deduct adjustment as represented by the slope of said plot for each number of said Sub-issue Types present in a given assessment,
wherein said overall rating yields an adjusted functionality Deduct Value less than the sum of the individual Sub-issue Type Deduct Values.

41. The system of claim 26 further comprising selecting said at least one specially adapted electronic processor from the group consisting of: laptop computers, computers, specially programmed computers, personal digital assistants (PDA), application specific integrated circuits (ASIC), and combinations thereof.

42. Electronically readable storage media tangibly embodying instructions which when executed by a at least one specially adapted electronic processor:
   accesses at least one engineering management system (EMS) accessible by said at least one specially adapted electronic processor;
   develops at least one list of functional impact Categories and specific Sub-issue Types thereunder that impact functionality of said asset for each said at least one specified use, said at least one list of functional impact Categories and specific Sub-issue Types thereunder stored on said electronically readable storage media;
   displays said list of functional impact Categories and specific Sub-issue Types to at least one evaluator;
   develops at least one question for each of said functional impact Categories;
   provides said at least one list of functional impact Categories, specific Sub-issue Types thereunder and said at least one question for each of said functional impact Categories on said at least one specially adapted electronic processor for use by at least said at least one evaluator;
   permits said at least one evaluator to use said list of functional impact Categories and specific Sub-issue Types thereunder and said at least one question for each of said functional impact Categories in an evaluation to evaluate functionality of said asset by observing issues of said asset;
   records on at least one said at least one specially adapted electronic processor occurrences of said issues under a corresponding said Sub-issue Type;
   assigns a Severity level, S, on a Severity scale to each said Sub-issue Type upon recording all said issues for each said Sub-issue Type;
   sums occurrences of said issues by said Sub-issue Type to determine a Density, D, of each said Sub-issue Type;
   records said evaluation of said at least one evaluator in said at least one engineering management system (EMS); and
   uses said recorded evaluation and employs at least one algorithm which takes into account a functionality deduct value and adjustment factor, to calculate as said objective measure a numerical value as a functionality index, FI; and
   uses said functionality index to evaluate an asset.

43. The electronically readable storage media of claim 42 in which said numerical scale has values from 0-100.

44. The electronically readable storage media of claim 42 in which at least parts of said at least one evaluation incorporated on said electronically readable media are said answers to at least one question for each of said Categories.

45. The electronically readable storage media of claim 42 in which said engineering management system incorporated on said electronically readable media is an application for evaluating buildings.

46. The electronically readable storage media of claim 42 in which said assets are selected from types of assets consisting of: buildings, facilities, paving systems, roads, railways, airports, dams, roofing systems, athletic fields, pipelines, transmission lines, public utility systems, communications systems, and combinations thereof.

47. The electronically readable storage media of claim 42 in which said communications system for providing said list of functional impact Categories and Sub-issue Types to said at least one evaluator is selected from the group consisting of: electronic communications, mail, hand delivery, and combinations thereof.

48. The electronically readable storage media of claim 42 accessible by devices selected from the group consisting of: electronic devices, laptop computers, personal digital assistants (PDA), computers, barcode readers, purpose-built electronic instruments, and combinations thereof.

49. The electronically readable storage media of claim 42 in which said combination of hardware and software for using said recorded evaluation to calculate as said measure a value to be inserted on a numerical scale as a functionality index, FI, is selected from the group consisting of: custom algorithms, application specific integrated circuits (ASIC), electronic devices, laptop computers, personal digital assistants (PDA), computers, purpose-built electronic instruments, and combinations thereof.

50. The electronically readable storage media of claim 42 in which said functionality index, FI, is developed for a specified use of an asset, further comprising:
   said at least one recorded evaluation incorporated in specially developed databases stored on electronically readable media accessible to said specially adapted electronic processor, said databases facilitating researching, categorizing, and enumerating said Sub-issue Types and specific issues as relate to at least obsolescence, user requirement changes, lost efficiency, and code and regulation compliance for said specified use of said asset;
   at least one functionality rating sheet accessible by at least said at least one specially adapted electronic processor, said rating sheet explicitly defining levels of functionality impact and sustainment, restoration, modernization (SRM) considerations at a number of discrete intervals along said scale of said functionality index, FI, said rating sheet delineating specified ranges at intervals along said rating scale, said rating sheet facilitating said at least one evaluator in judging functionality scenarios, determining which said interval is a best fit, and assigning a score within said interval;

at least one display in operable communication with at least said at least one specially adapted electronic processor to display said rating sheet, Sub-issue Types and specific issues, together with a number of different functionality impact scenarios for at least one use of said asset and for use by at least one panel of experts to provide functionality impact ratings of said asset in meeting said at least one use, given the presence of said Sub-issue Types;

at least one algorithm contained on said electronically readable media accessible to said at least one specially adapted electronic processor, said at least one algorithm facilitating use of said ratings to develop quantitative functionality deduct value relationships;

at least one checklist of procedures accessible by at least said at least one specially adapted computer, said checklist for use of said evaluators; and at least one assessment checklist in said at least one engineering management system for use by said evaluators.

51. The electronically readable storage media of claim 42 incorporating on said electronically readable media at least one software interface flowchart in said at least one engineering management system.

* * * * *